US 8,137,722 B2

(12) United States Patent
Garwood

(10) Patent No.: US 8,137,722 B2
(45) Date of Patent: Mar. 20, 2012

(54) METHOD FOR SEPARATION OF FATTY MATERIALS TO PRODUCE LEAN MEAT PRODUCTS

(76) Inventor: Anthony J. M. Garwood, Mercer Island, WA (US)

(*) Notice: Subject to any disclaimer, the term of this patent is extended or adjusted under 35 U.S.C. 154(b) by 752 days.

(21) Appl. No.: 11/911,338

(22) PCT Filed: Apr. 13, 2006

(86) PCT No.: PCT/US2006/014261
§ 371 (c)(1),
(2), (4) Date: Oct. 9, 2008

(87) PCT Pub. No.: WO2006/113543
PCT Pub. Date: Oct. 26, 2006

(65) Prior Publication Data
US 2009/0214733 A1    Aug. 27, 2009

Related U.S. Application Data

(60) Provisional application No. 60/671,238, filed on Apr. 13, 2005.

(51) Int. Cl.
*A22C 17/00* (2006.01)
(52) U.S. Cl. .................. 426/417; 426/480; 99/537
(58) Field of Classification Search ............ 426/417, 426/480; 99/537
See application file for complete search history.

(56) References Cited

U.S. PATENT DOCUMENTS

| | | | |
|---|---|---|---|
| 5,147,672 | A | 9/1992 | McLachlan |
| 5,378,418 | A | 1/1995 | Berger |
| 5,435,443 | A | 7/1995 | Hohenester et al. |
| 5,552,173 | A | 9/1996 | Singh |
| 6,036,630 | A | 3/2000 | Robey |
| 6,172,246 | B1 | 1/2001 | Franke |
| 7,666,456 | B2 | 2/2010 | Garwood |
| 2001/0007690 | A1 | 7/2001 | Girsh |
| 2009/0214730 | A1 | 8/2009 | Garwood |
| 2011/0008505 | A1 | 1/2011 | Garwood |

FOREIGN PATENT DOCUMENTS
GB        357207 A     9/1931

*Primary Examiner* — Anthony Weier
(74) *Attorney, Agent, or Firm* — Christensen O'Connor Johnson Kindness PLLC

(57) ABSTRACT

A method and apparatus for separating lean meat and/or fat from lean meat-containing material. The material is introduced into a vessel and is separated into low density and high density fractions. The material from the low density fraction is removed via an outlet and has a higher percentage of fat than the material introduced into the vessel. The material from the high density fraction is removed via an outlet and has a higher percentage of lean meat than the material introduced into the vessel. The vessel can include a centrifuge bowl or an inclined vessel. Separation is achieved via gravity or the application of an artificial force field, such as centrifugal force, to separate particulates high in density from those low in density.

2 Claims, 24 Drawing Sheets

Section X-X

METHOD FOR SEPARATION OF FATTY MATERIALS TO PRODUCE LEAN MEAT PRODUCTS

CROSS-REFERENCE TO RELATED APPLICATION

This application is the national stage of International Application No. PCT/US2006/014261, filed on Apr. 13, 2006, which claims the benefit of U.S. Provisional Patent Application No. 60/671,238, filed on Apr. 13, 2005, incorporated herein expressly by reference.

FIELD OF THE INVENTION

The present invention relates to the separation of materials high in fat into a first and second material with controlled amounts of fat and/or lean meat.

BACKGROUND

Trimming fat from meat, either by hand or via a machine, inevitably results in cutting some of the more valuable lean meat along with the fat. Typically the "trimmings" are collected and used in sausage production or are rendered. Lean meat comprises predominantly muscle protein although some amounts of fat and tallow are present, while fat and tallow comprises predominantly glycerides of fatty acids with connective tissue and collagen and are the predominant constituents of plant and animal fat. The value of lean meat in the trim is low compared to boneless beef having a fat content of 15% by weight, for example. The value of 50% lean meat trim is perhaps on the order of 35 cents per pound compared to perhaps about $1.10 for 85% for boneless lean meat. It is therefore desirable to separate the lean meat from the trim while increasing the proportion of lean meat compared to fat.

SUMMARY

A method and apparatus for separating lean meat and/or fat from lean meat-containing material, including combining a particulate material with fluid carbon dioxide. The material and fluid is introduced into a vessel and is separated into low density and high density fractions. The material from the low density fraction is removed via an outlet and has a higher percentage of fat than the material introduced into the vessel. The material from the high density fraction is removed via an outlet and has a higher percentage of lean meat than the material introduced into the vessel. The vessel can include a centrifuge bowl or an inclined vessel. Separation is achieved via gravity or the application of an artificial force field, such as centrifugal force, to separate particulates high in density from those low in density.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
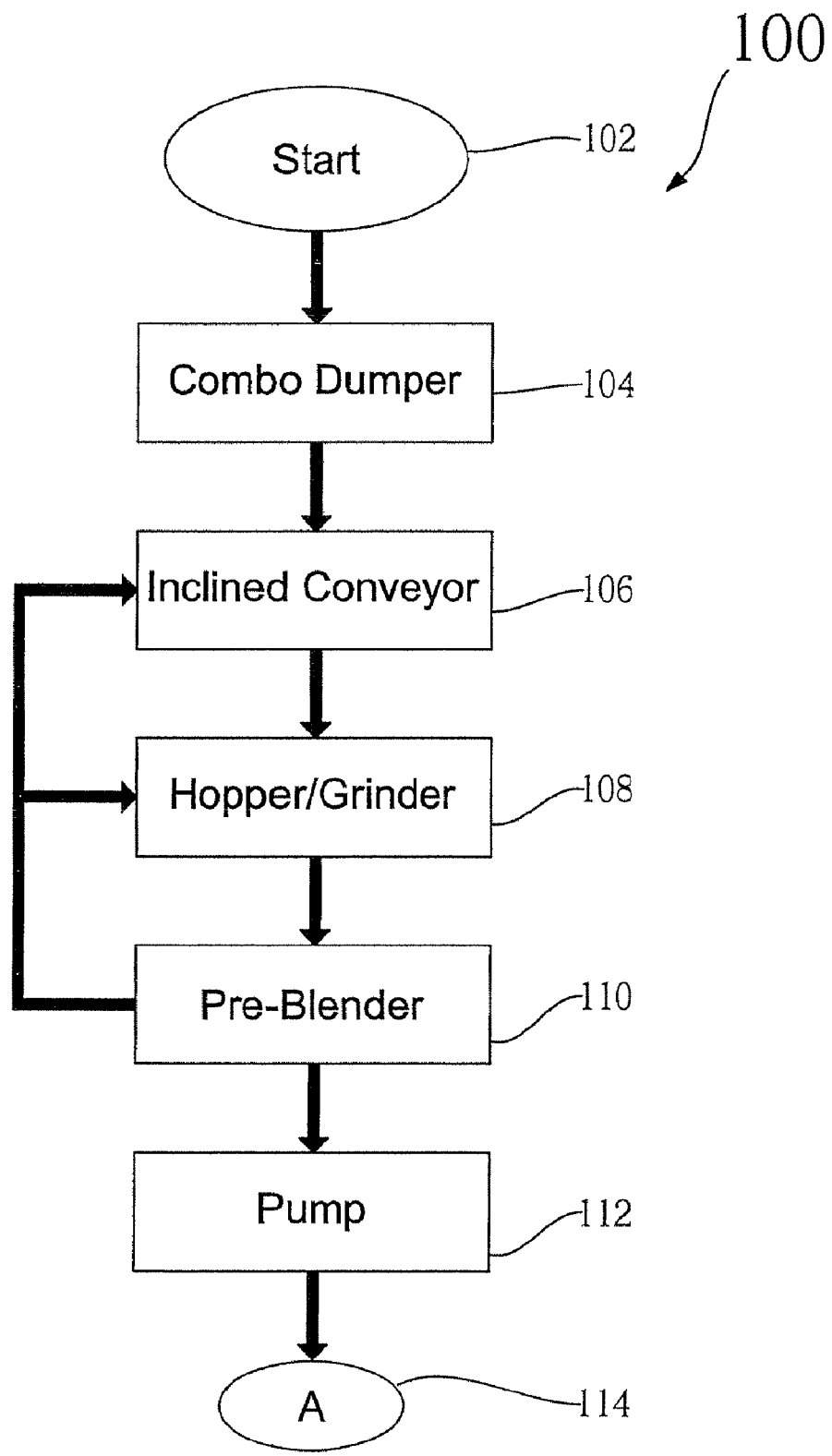
FIG. 1 is a flow diagram of a method in accordance with one embodiment of the present invention.
Figure 2:
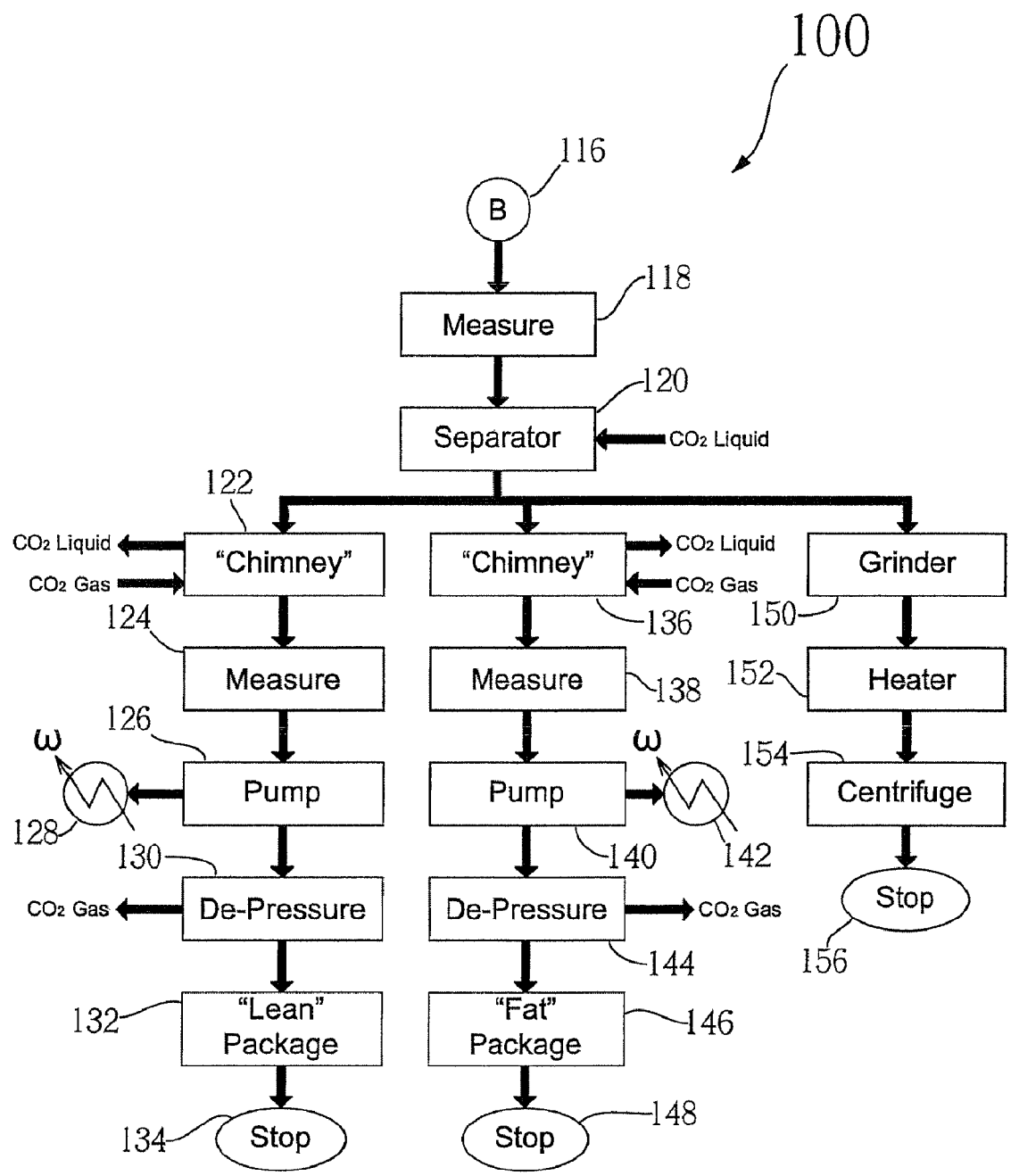
FIG. 2 is a flow diagram of a method in accordance with one embodiment of the present invention.
Figure 3:
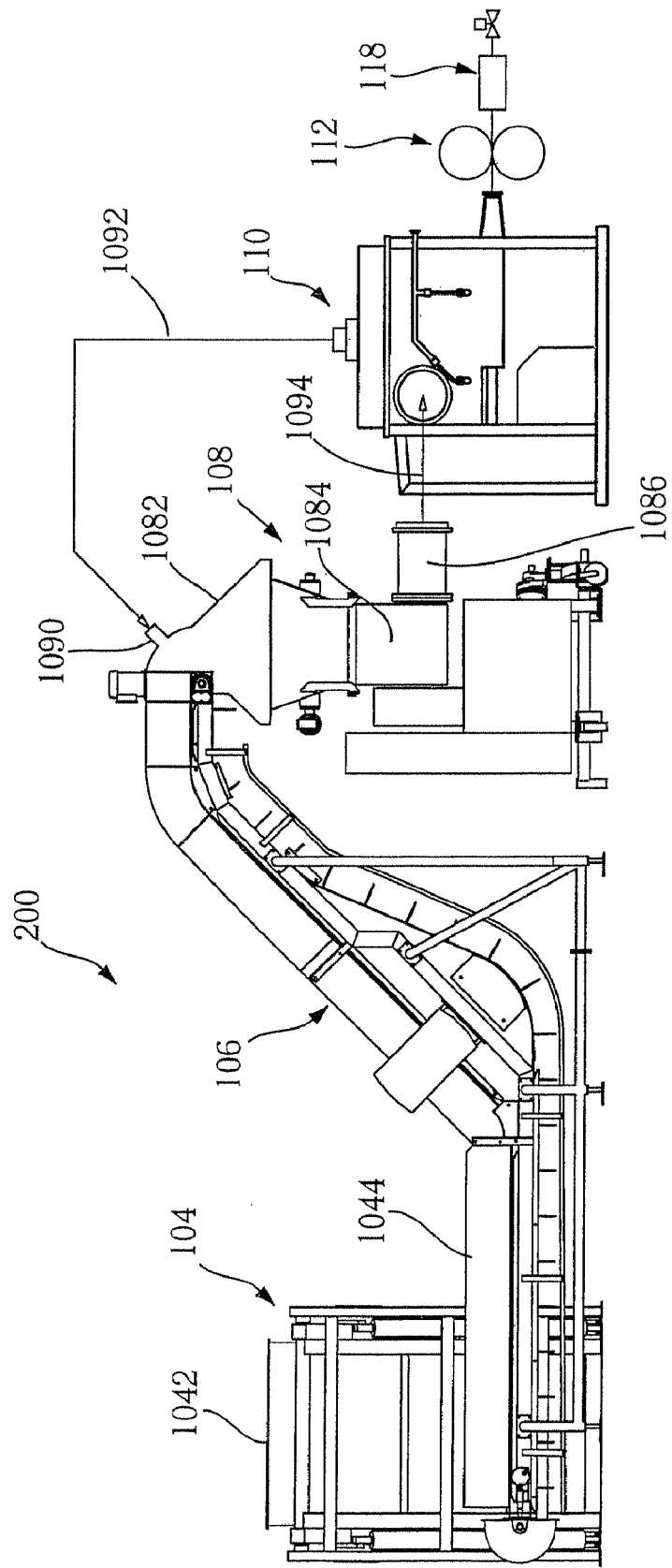
FIG. 3 is a diagrammatical illustration of an apparatus in accordance with one embodiment of the present invention.

FIGS. 1 and 2 illustrate a representative method 100 in accordance with one embodiment of the present invention. Method 100 commences at start block 102. From start block 102, the method 100 enters block 104. Block 104 represents loading material for the start of a process to separate fat from the material. A combo-dumper includes a device which may include means to seize a container and offload the container onto the conveyor of block 106. The material loaded by the combo-dumper of block 104 can be any material which has a fatty substance that is to be separated to produce products that are high in lean meat and/or low in fat content. A representative combo-dumper is illustrated in FIG. 3.

Figure 4:
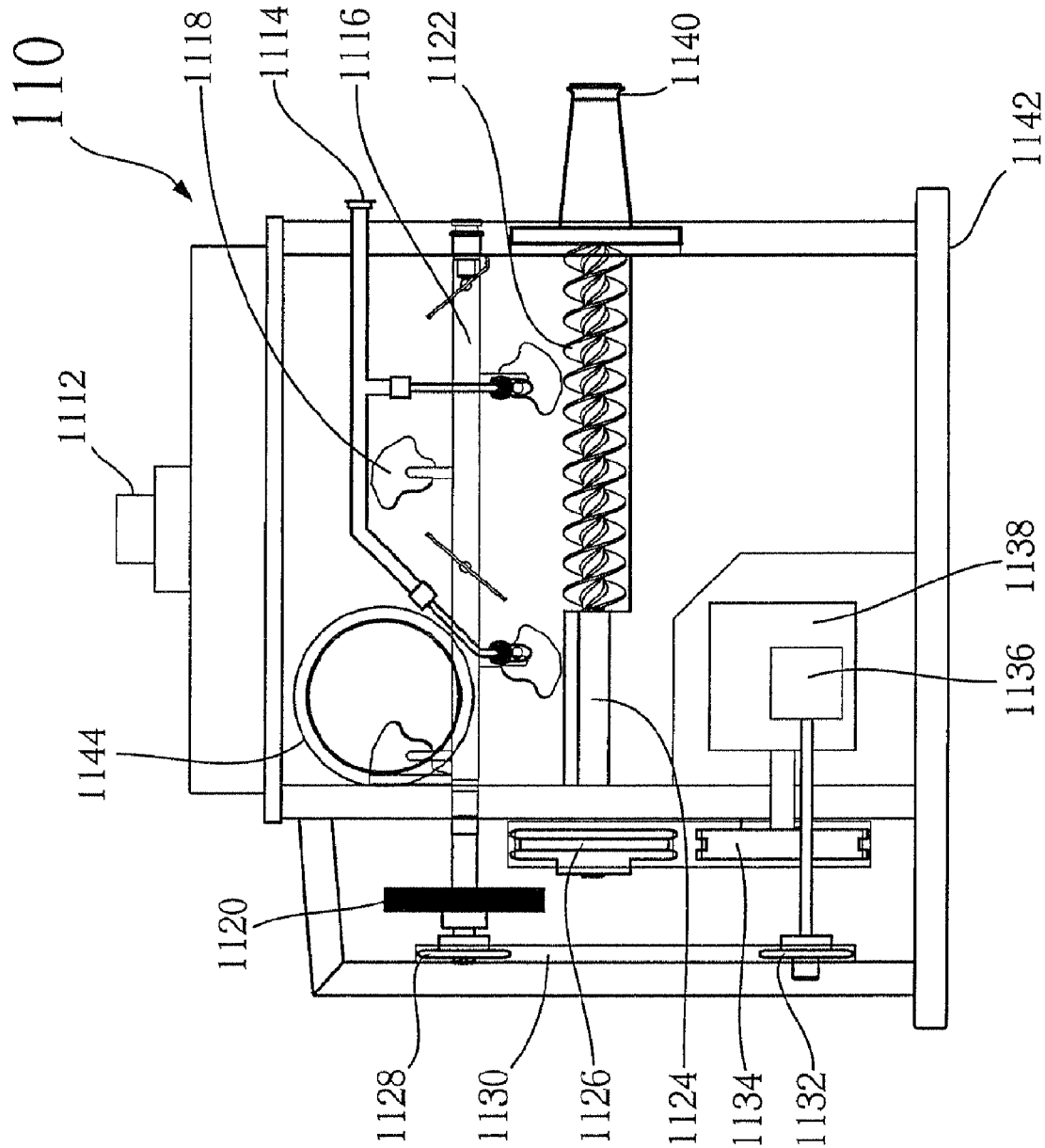
FIG. 4 is a diagrammatical illustration of apparatus in accordance with one embodiment of the present invention.

From block 104, the method 100 enters block 106. Block 106 is for conveying the material from the combo-dumper of block 104 to a hopper/grinder apparatus of block 106. A representative conveyor is illustrated in FIG. 3. From block 106, the method 100 enters block 108. Block 108 represents the grinding of the material via a hopper/grinder apparatus. A representative hopper/grinder apparatus is illustrated in FIG. 3. Material is transferred into the hopper from the inclined conveyor, which falls into the grinder bin for grinding into particulates, or particles, of smaller size as compared to the portions provided in the combo-dumper, block 104. From block 108, the method 100 enters block 110. Block 110 is for pre-blending the small particulates of ground material with liquid carbon dioxide. An apparatus for pre-blending is illustrated in FIG. 4. In one embodiment, the pre-blender is pressurized and substantially enclosed to provide an atmosphere substantially deficient of oxygen. The concentration of oxygen in the pre-blender can be about 500 ppm or less. Pre-blending is performed with liquid carbon dioxide in an enclosed vessel at an operating pressure from about atmospheric to about 300 psig, and at a temperature from about 29° F. to about 31° F. Gaseous carbon dioxide that is produced from the liquid carbon dioxide can be vented from the pre-blender via a hood and can be carried via a vent line to a gaseous carbon dioxide collection system. Liquid carbon dioxide is provided to the pre-blender by a liquid carbon dioxide distribution system which will be described in further detail below. Gaseous carbon dioxide that vents from the pre-blender block 110, may also be distributed to the hopper/grinder of block 108 or the inclined conveyor of block 106. From block 110, the method 100 enters block 112. Block 112 is for pumping the material from the pre-blender block 110 to a measuring device block 118. The pump of block 112 can produce a head pressure up to about 650 psi.

In the flow diagram of FIG. 1, continuation block 114 follows pumping block 112. Continuation block 114 signifies that method 100 is continued on FIG. 2 at block 116. From block 116, the method 100 enters block 118. Block 118 is for measuring the material after pumping, block 112. A suitable measuring instrument is known by the designation COREOLUS. A measuring instrument of block 118 can measure any one or all of the fat content, the lean meat content, the water content, and the flow rate being pumped. A suitable measuring instrument may include any device which uses x-rays to scan the material and determine the fat, lean, and/or water content of the material. From block 118, the method 100 enters block 120. Block 120 is for separating the ground material into at least two streams of material. Separation block 120 uses liquid carbon dioxide as a separating medium which permits ground material to separate into fractions according to the density of the particulates. One embodiment of the separation apparatus includes a settling vessel. Another embodiment includes a centrifuge. The ground material is separated into two or more fractions based on the density of each particulate of material, into two or more streams, wherein each separate stream has a different content of fat than the material that was fed into the separator. For example, a first stream of material can comprise mostly fat, while a second stream of material can comprise mostly lean meat. In one embodiment, the content of fat and lean meat can be determined via controllable parameters. The separator of block 120 operates by density differences between particulates of fat and particulates of lean meat. Such materials have varying densities, causing the particulates to stratify according to density in the liquid medium. A preferred medium is liquid carbon dioxide. In addition to serving as the separating medium, liquid carbon dioxide also possesses biocidal properties; thus, simultaneously ensuring sanitizing of the material in block 120. A separator apparatus of block 120 can include apparatus generally termed a "centrifuge," or, alternatively, the separator of block 120 can include a settling vessel which allows settling of the higher density particulates and collection of the less dense particulates from the surface of the liquid medium. Suitable separators will be described at length below.

From block 120, the method 100 follows two or more parallel paths, depending on the number of separation fractions or desired treatment of fat. While two parallel paths are illustrated, more than two fractions can be collected from the separator, and each fraction can be processed similarly, or may include fewer, additional, or different steps. For example, a first path represents the treatment of the first stream of mostly fat material, while a second stream represents the processing of a mostly lean meat material. For purposes of illustration, the process illustrated on the left side of FIG. 2 will represent the processing of lean meat material, while the process illustrated in the center and on the right side of FIG. 2 will represent alternatives for the processing of fat material. Block 122 includes processing by an apparatus which is herein described as a "chimney." A chimney, as used in this application, is for separating solid materials from liquid and/or gaseous materials, for example, gaseous and liquid carbon dioxide. A chimney will be described in further detail below. The chimney of block 122 separates solid materials from liquid and gaseous carbon dioxide that may have been carried over with the material used in the separation block 120. Collection of carbon dioxide is advantageous from the standpoint of avoiding waste and the loss of carbon dioxide. From block 122, the method 100 enters block 124. Block 124 is for measuring the solid material exiting block 122. A suitable measuring instrument is similar to the measuring instrument described for block 118. From block 124, the method 100 enters block 126. Block 126 is for extracting work 128 by operating a pump as a generator. For example, since separator 120 and chimney 122 are operated at pressures ranging from about 300 psig to about 1000 psig, the driving force for transferring material after separator and chimney blocks is via a drop in pressure, rather than from a mechanical rotating apparatus. The expansion of and/or the release of the pressure in the line through which material travels can operate a generator 128 that produces work. From block 126, the method 100 enters block 130. Block 130 is a final depressurizing step to bring the material to atmospheric pressure. Any residual carbon dioxide is collected as gaseous carbon dioxide and sent to the gaseous carbon dioxide collection system. From block 130, the method 100 enters block 132. Block 132 is for packaging the lean meat. Embodiments for packaging are described below. From block 132, the method 100 enters block 134. Block 134 signifies the end of one iteration of method 100. For material higher in fat, the process after separator block 120 can follow similar steps, or alternatively, a different process. Corresponding to blocks 122, 124, 126, 128, 130, and 132, are blocks 136, 138, 140, 142, and 146, respectively. In one alternate embodiment, material that is high in fat can be processed according to a second path. From separator block 120, fat particulate material can be reground in a fine grinder in block 150. The fine grinder can grind material using a grind plate with apertures of about 1/16" to about 1/8". From block 150, the method 100 enters block 152. Block 152 is for heating the twice ground fat material from block 150 to a temperature in the range of about 100° F. to 120° F. Preferably, the temperature can be maintained below 120° F. to avoid damage. From block 152, the method 100 enters block 154. Block 154 is for separating material via a centrifuge. Embodiments of the centrifuge are described below. The centrifuge can separate oil from solid materials. Solids include cartilage, collagen, connective tissue, cell walls, etc. The oil recovered from the centrifuge block 154 can be used, for example, to convert into biodiesel. Method 100 may be continuously applied to materials to continuously produce packaged products containing lean meat and/or fat.

Referring to FIG. 3, a portion of apparatus 200 is illustrated including the combo-dumper 104, the inclined conveyor 106, the hopper/grinder 108, the pre-blender 110, the pump 112, and the measuring instrument 118.

The combo-dumper 104 can include a set of parallel tracks which elevate bins 1042 containing material to be ground into particulates for separation. Bins 1042 may be delivered to combo-dumper 104 via a forklift truck. Combo-dumper 104 elevates the bins 1042 with lifting tracks and empties the bins 1042 onto a horizontal conveyor 1044. The horizontal conveyor 1044 can include an endless conveyor belt disposed around two rotating rollers. The material from bin 1042 is conveyed horizontally on horizontal conveyor 1044, and is then transferred to the inclined conveyor 106. The purpose of the inclined conveyor 106 is to elevate the material from the horizontal conveyor 1044 to an elevation that reaches the unloading height at the hopper/grinder apparatus 108. The inclined conveyor 106 may include an endless conveyor belt disposed around a first and a second roller. Additionally, the conveyor belts for the horizontal and the inclined conveyors 106 and 108 can have transverse plates mounted to the belts, which compartmentalizes the conveyor belts into a type of "bucket" conveyor which can unload material in discrete quantities. The horizontal and inclined conveyors may be enclosed by ducting so that a gas, such as carbon dioxide, may be pumped therein to retard and/or prevent premature spoilage of the material by minimizing exposure to atmospheric oxygen. The inclined conveyor 106 deposits the material into the hopper/grinder apparatus 108.

The hopper/grinder apparatus 108 includes a hopper portion 1084 and a grinder portion 1086. The hopper portion 1084 includes an area for holding deposited material before grinding. The hopper portion 1084 may be covered or enclosed by a hood 1082. The hood 1082 is connected to the ducting enclosing the horizontal and inclined conveyors 106 and 108. Alternatively, the hood 1082 may vent to a gas collection system. Gaseous carbon dioxide vented from the pre-blender 110 may be transferred into the hopper/grinder 108 via the vent line 1092 through the hood nozzle 1090. In this manner, material which enters the hopper/grinder 108 is exposed to an atmosphere substantially deficient of oxygen, which can be mostly comprised of carbon dioxide gas. A grinder 1086 is connected to the bottom section of the hopper 1084. The grinder 1086 grinds material into particulates that are fed into the pre-blender 110. The grinder 1086 can utilize a cutting plate having holes in the size range from about 1/16" (inches) to about 1/2" (inches). The advantage of grinding material to this size range is that the particulates that result tend to be substantially either all fat or lean meat. However, proportions of fat and lean meat in any individual particulate may vary from particulate to particulate. Material in sizes less than 1/16" or greater than 1/2" are disadvantageous because particulates begin having about similar amounts of fat and lean meat, making separation by density more difficult. A preferred size of cutting plate holes is 1/16" to 3/8", and 1/4" to 3/8". A conduit 1094 connects the outlet from grinder 1086 to the entrance nozzle of the pre-blender 110. Pre-blender 110 is described in further detail in association with FIG. 4, which is now referenced.

The pre-blender 110 is a vessel which is substantially enclosed to provide an atmosphere which is substantially deficient of oxygen. The interior of the pre-blender 110 is fitted with one or more shafts having an arrangement of paddles 1118 used for mixing. Paddles 1118 are disposed on the shaft 1116. The shaft 1116 is supported at both ends of the walls of the pre-blender 110 via a set of bearings to permit rotation. One end of the shaft 1116 protrudes through the wall of the pre-blender vessel. A sprocket 1120 is connected on the shaft 1116 which protrudes to the exterior. A pulley 1128 is also connected to shaft 1116 at the end of shaft 1116. A second shaft (not shown) having a second set of paddles (not shown) is disposed directly behind the shaft 1116 and paddles 1118. The shaft that is not shown includes a sprocket (similar to 1120) which meshes with sprocket 1120, such that rotation of one shaft will drive the other to rotate in the opposite direction. The pulley 1128 is attached to drive belt 1130. A driver 1136 has a drive pulley 1132 which is connected to the end of the power transfer shaft from the driver 1136. The pulley 1132 is connected to the pulley 1128 via the drive belt 1130 to drive the shaft 1116. As can be appreciated, rotation of the shaft 1116 will cause an agitating motion to material deposited within the pre-blender 110 via the action of the rotating paddles 1118. Paddles 1118 also transfer material deposited through entrance nozzle 1144 from the back to the front of the pre-blender 110 to expose material to the greatest extent possible to liquid and/or gaseous carbon dioxide while resident within pre-blender 110. Material eventually enters a recess 1146 disposed at the forward, bottom, and center of the pre-blender 1110. A close tolerance screw conveyor 1122 is provided within the recess 1146. Material is transferred by the screw conveyor 1122 and a matching screw conveyor (not shown) through the exit nozzle 1140. Screw conveyor 1122 is connected to shaft 1124. The shaft 1124 is supported at both ends of the pre-blender 110 via a set of bearings. One end of the shaft 1124 projects outside of the pre-blender vessel 110. The end of the shaft 1124 which is on the exterior is fitted with a pulley 1126. Pulley 1126 is connected to driver 1138 via a drive belt. A second driver 1138 includes a drive pulley 1134. The drive pulley 1134 connects to the pulley 1126 to drive the shaft 1124 and the screw conveyor 1122. Although a single screw conveyor 1122 is illustrated, preferably, the pre-blender 110 includes a first and a second screw conveyor, which can rotate opposite to screw conveyor 1122, but will transfer material forward. Only a single paddle 1118 and screw conveyor 1122 are shown for clarity and for brevity. The pre-blender 110 is substantially enclosed, which allows the pre-blender 110 to contain a modified atmosphere. The pre-blender 110 includes liquid carbon dioxide injection nozzles 1148 and 1150. Liquid carbon dioxide is provided to injection nozzles 1148 and 1150 from the liquid carbon dioxide supply line 1114 connected to a liquid carbon dioxide distribution system. The liquid carbon dioxide distribution system is described in further detail below. Liquid carbon dioxide injection nozzles 1148 and 1150 are placed at a location to deliver liquid carbon dioxide below the material entrance nozzle 1144. By placing the liquid carbon dioxide injection nozzles 1148 and 1150 at a low point on the pre-blender 110 and below the entrance nozzle 1144, any oxygen transferred with material can be purged from the material entering via the entrance nozzle 1144.

The liquid carbon dioxide entering the pre-blender 110 mixes intimately with the material entering via the entrance nozzle 1144 due to the placement of the liquid injection nozzles 1148 and 1150 below the entrance point and the agitating action created by the paddles 1118. The pre-blender 110 operating pressure is in the range from about atmospheric pressure to about 300 psig and the operating temperature can be in the range from about 27° C. to about 31° C. Any liquid carbon dioxide which vaporizes is vented via the vent nozzle 1112 located at the upper portion of the pre-blender vessel 110. Gaseous carbon dioxide vented through vent nozzle 1112 can be collected and fed into the hood 1082 of the hopper/grinder 108 through the vent line 1092.

Returning to FIG. 3, the material exiting the pre-blender 110 via exit nozzle 1140 is pumped via the pump 112. Pump 112 delivers a head pressure of about 650 psi. From pump 112, the material is measured via measuring device 118. After passing through measuring device 118, material enters the separator 120. In one embodiment, the separator 120 is a settling vessel illustrated in FIG. 5. However, in another embodiment, a centrifuge can be the separator. A centrifuge is illustrated in FIGS. 9-14. A separator 120, as described herein, can separate particulates of fat and lean meat via the density differences between particulates. Particulates can be produced by grinding at an appropriate size range. It was unexpected that utilizing a grind plate with holes of about ¼" to about ⅜" results in particulates that are substantially all fat or substantially all lean meat. Fat includes any adipose tissue, but is generally referred to herein as fat.

Figure 5:
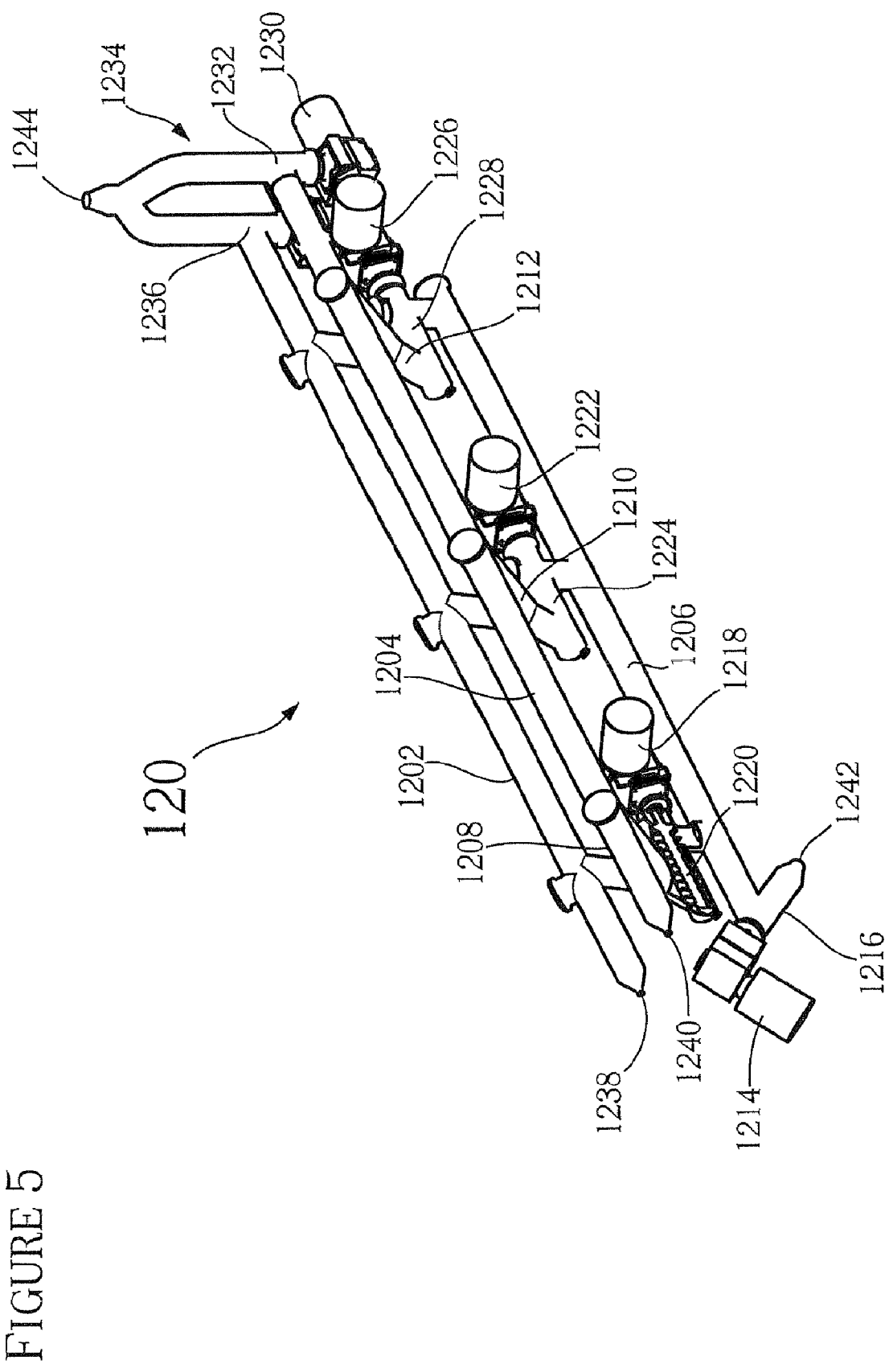
FIG. 5 is a diagrammatical illustration of apparatus in accordance with one embodiment of the present invention.

Referring to FIG. 5, an inclined separator 120, which is used to separate materials utilizing a settling process, is illustrated. The separator 120 includes a first elongated hollow tube 1202, a second elongated hollow tube 1204, and a third elongated hollow tube 1206. The first tube 1202 and the second tube 1204 are substantially parallel to each other and at substantially the same elevation. The third tube 1206 is parallel to tubes 1202 and 1204, but at a lower elevation than either tubes 1202 and 1204. Other embodiments may comprise fewer or additional tubes. The operating pressure of tubes 1202, 1204, and 1206 is in the range of from about 300 psig to about 1000 psig. Preferably, from about 400 psig to about 900 psig, and from about 500 psig to about 700 psig. The pressure of the tubes 1202, 1204, and 1206 can be in the range on the carbon dioxide pressure-enthalpy diagram wherein the pressure and temperature are chosen so that carbon dioxide is a liquid. The conduit from measuring device 118 (FIG. 3) is separated into two distinct conduits so as to feed two of the tubes 1202 and 1204. Alternatively, a single tube can be used. The tube 1202 and the tube 1204 each include an inlet nozzle 1238 and 1240, respectively. From measuring device 118, ground particulates are fed to one of the nozzles 1238 and 1240. Prior to, or via a separate nozzle (not shown), liquid carbon dioxide can be injected into the tubes 1202 and 1204. The tubes 1202 and 1204 are connected to one another at several locations along the length of the tubes, and at different elevations. The locations where tubes 1202 and 1204 connect to one another are approximately at both upper and lower ends and about midpoint in the tubes. Each location where the tubes 1202 and 1204 are joined is provided with a Y connector 1208, 1210, and 1212. The Y connectors 1208, 1210, and 1212 are placed at varying elevations along the length of the tubes 1202, 1204, and 1206. Each Y connector has a first and a second leg, each extending from a common third leg. Each of the upper legs of the Y connectors 1208, 1210, and 1212, respectively, connect to the lower side of one of tube 1202 or tube 1204. The common leg of the Y connectors 1208, 1210, and 1212 connects to a housing 1220, 1224, and 1228, each of which houses a screw conveyor. In operation, the assembly of tubes 1202, 1204, and 1206 is inclined at an angle from the ground plane, which can be greater than 0, up to and including a right angle of 90° from the ground plane. Inclining the separator 120 is advantageous to utilize the force of gravity to assist in settling of materials toward the bottom of the assembly. Legs of the Y connectors 1208, 1210, and 1212, which connect to either of tubes 1202 or 1204 are provided at different elevations to transfer settled material from tubes 1202 and 1204 into the housing sections 1220, 1224, and 1228. The screw conveyors within each of the sections 1220, 1224, and 1228 is driven respectively by the drivers 1218, 1222, and 1226. It is noteworthy to point out that Y connectors 1208, 1210, and 1212 are inclined with respect to the tubes 1202 and 1204 so as to be nearly perpendicular to the ground plane. Furthermore, connections of the Y connectors 1208, 1210, and 1212 to each of the tubes 1202 and 1204 are made at the lower surface thereof so as to capture settled material which accumulates in the lower portions of tubes 1202 and 1204. Therefore, material that settles at the bottom and along the length of the tubes 1202 and 1204 will be transferred via the Y connectors 1208, 1210, and 1212 into the screw conveyor housings 1220, 1224, and 1228. From there, the settled material will be transferred to a third tube 1206, where material further settles along the bottom of tube 1206, which ultimately settles to the lower end of tube 1206 at the housing 1216 also housing a screw conveyor.

The series of tubes 1202, 1204, and 1206 can be enclosed and sealed such that the tubes can be pressurized up to 1500 psia. The entire internal space of tubes 1202, 1204, and 1206 and connections can be filled with a fluid, such as liquid carbon dioxide. Particulates that are introduced into tubes 1202 and 1204 will then either tend to float or sink depending on the density. Fat will tend to float upward and in the direction along the length of tubes 1202 and 1204. Lean meat will tend to sink and flow in the opposite direction and fall through one of the Y connectors 1208, 1210, and 1212. Any fat falling through Y connectors can be agitated and will be able to float upward through Y connectors 1208, 1210, and 1212 into tubes 1202 and 1204. Any lean meat that may have been carried with fat has the opportunity to sink downward into tube 1206 through Y connectors 1208, 1210, and 1212. It can be seen, therefore, that substantially all lean meat will ultimately be transferred toward the lower end of tube 1206 to be transferred out of separator 120 through outlet nozzle 1242, while fat will most likely be carried into housings 1232 and 1236 to be transferred out of separator 120 through outlet 1244. The ends of tubes 1202 and 1204 distal to entrance nozzles 1238 and 1240 are connected to perpendicular conduits 1236 and 1232, each housing a screw conveyor therein. A driver 1234 (not shown) drives the screw conveyor in housing 1236, and a driver 1230 drives the screw conveyor in housing 1232. Housings 1236 and 1232 join to form a single outlet nozzle 1244.

Liquid carbon dioxide, particulate materials including particulates of fat, particulates of lean meat, and particulates having both fat and lean meat are injected into the tubes 1202 and 1204 via the entrance nozzles 1238 and 1240. Liquid carbon dioxide, fat particulates, lean meat particulates, and particulates having both fat and lean meat begin flowing within the tubes 1202 and 1204, generally in an upward direction with the flow of the liquid carbon dioxide toward housings 1236 and 1232. The pressure and temperature of the liquid carbon dioxide is controlled to result in a density which will allow the particulates that are denser than the liquid carbon dioxide to settle toward the bottom of the tubes 1202 and 1204 and along the length of the tubes, while particulates that are less dense than the liquid carbon dioxide will not settle and will remain with the liquid carbon dioxide or float to the top and are carried with the liquid carbon dioxide along the entire length of tubes 1202 and 1204. The density of liquid carbon dioxide can range from 50 lbs/cu. ft. to 65 lbs/cu. ft.; 53 lbs/cu. ft. to 62 lbs/cu. ft.; 55 lbs/cu. ft. to 60 lbs/cu. ft.; and 57 lbs/cu. ft. to 59 lbs/cu. ft. Generally, the density of liquid carbon dioxide is about 58 lbs/cu. ft. The amount of liquid carbon dioxide in the separator 120 is about four times the solid material by weight or volume. Water may optionally be introduced with liquid carbon dioxide. Water may optionally contain salt, such as sodium chlorite, which is blended to provide 500 parts per million (ppm) to 1.2 million ppm or more in solution. Any other salts or additive may be included; however, sodium chlorite is a preferred salt since an anti-microbial effect can be achieved with such a blend. Liquid carbon dioxide, when included in the slurry, maintained at a pressure of approximately 500 psig to 750 psig, and at a temperature of 29.5° F. up to 36° F., when combined with sufficient water can create a pH value of 2.9, which is adequate to react with sodium chlorite, the combined quantity creating acidified sodium chlorite which has anti-microbial properties capable of reducing bacteria by several logs. Furthermore, the addition of sodium chlorite can be added in such proportions so as to adjust the specific density of the liquid which can be utilized to enhance the separation of fat particulates from lean meat particulates. For example, liquid carbon dioxide at about 725 psig, and 32° F. may have a specific gravity of 0.94, and the addition of, for example, 3% water containing sodium chlorite of 1200 ppm can increase the specific gravity of the liquid carbon dioxide to about 0.95. At such specific gravity, fat will float quite readily. However at a specific gravity of 0.93, fat may tend to sink and prove difficult to separate from the lean meat. Particulates settle along the bottom of tubes 1202 and 1204 and pass into the Y connectors 1208, 1210, and 1212, depending on the settling rate and the density of each individual particulate based on the amounts of respective fat and lean meat in each individual particulate. In some embodiments, the particulates are on average substantially fat and substantially lean meat, if ground to the proper size. Although three Y connectors connecting tubes 1202 and 1204 to the third tube 1206 are illustrated, it is to be understood that fewer or additional Y connectors can be provided. Generally, as particulates flow upwards through tubes 1202 and 1204 and increase in elevation, the heavier, denser particulates, i.e., the particulates comprising the greatest proportions of lean meat, will settle first and pass through Y connector 1208 which is at the lowest elevation on tubes 1202 and 1204, the next less dense particulates will settle and be collected through Y connector 1210 which is at a midpoint elevation, and the least dense will settle last and be collected through Y connector 1212 which will have traveled to the highest elevation. While all Y connectors feed into the same third tube 1206 where they combine with each other, in other embodiments, material gathered at each Y connector can be segregated from other settled material from other Y connectors to provide a way of producing three streams of product each having a different proportion of lean meat owing to the elevation at which the particulates are collected. In the inclined, elongated separator 120, particulates that have a density greater than liquid carbon dioxide in the separator will be collected at a lower elevation, and particulates that have a density greater than liquid carbon dioxide will be collected at a respective higher elevation. The lean meat particulates that are collected through any Y connector are transferred by the screw conveyor connected to the third, common legs of the Y connectors 1208, 1210, and 1212. Screw conveyors in housings 1220, 1224, and 1228 function to convey lean meat particulates collected through Y connectors from tubes 1202 and 1204 into the third tube 1206. Tube 1206 is parallel to tubes 1202 and 1204, but is at a lower elevation than tubes 1202 and 1204 for the entire length. Additionally, screw conveyors 1220, 1224, and 1228 may remove some of the liquid carbon dioxide from the collected lean meat particulates, which is then transferred back into the Y connectors 1208, 1210, and 1212 and into tubes 1202 and 1204. Lean meat particulates deposited into the tube 1206 from the Y connectors 1208, 1210, and 1212 will settle by gravity toward the lower section of tube 1206 into housing 1216 that contains a screw conveyor. Screw conveyor in housing 1216 transfers settled material and liquid carbon dioxide from tube 1206 out through the outlet nozzle 1242 and is forwarded to a chimney in the process block 122 of FIG. 2. The fat particulates (those which do not have time to settle) and liquid carbon dioxide flow upwardly through tubes 1202 and 1204, as mentioned above, and are transferred by screw conveyors contained in housings 1236 and 1232 at the top end of tubes 1202 and 1204 via the outlet nozzle 1244. From outlet nozzle 1244, fat particulates and liquid carbon dioxide are transferred to a second chimney, shown as process block 136 in FIG. 2.

In another embodiment, water can be substituted for carbon dioxide such that only water alone is used as the fluid medium used in any apparatus to enable separation of fat and lean meat. In this embodiment, excess water that may be retained with the separated lean meat can be removed by exposure to anhydrous carbon dioxide. Furthermore, such water may also contain (acidified) sodium chlorite solution in small quantities used as a "dip" which is then followed by immersion of the separated lean meat in liquid carbon dioxide to remove excess water.

Figure 6:
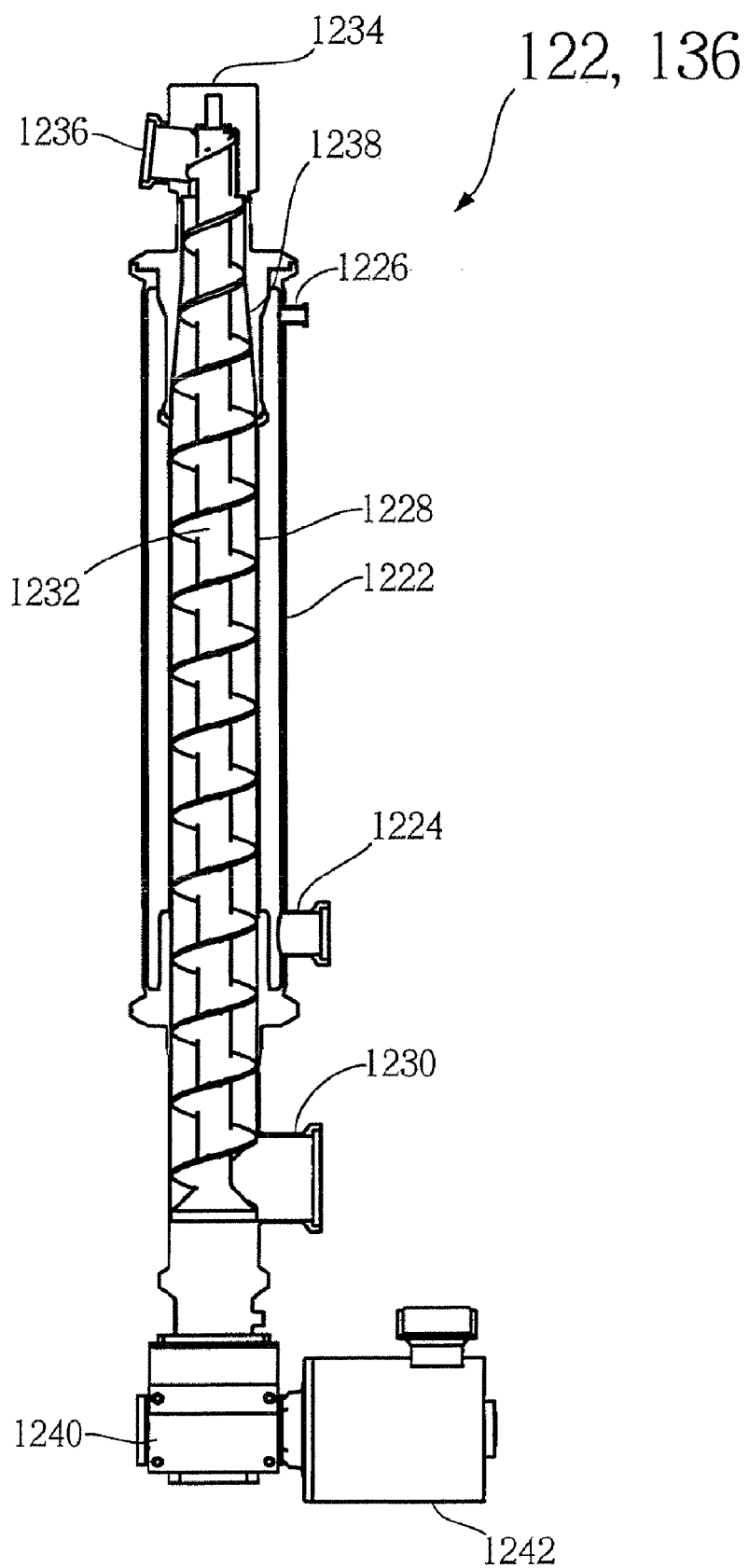
FIG. 6 is a diagrammatical illustration of apparatus in accordance with one embodiment of the present invention.

Referring to FIG. 6, a representative chimney is illustrated for use as chimneys 122 and 136. Both chimneys 122 and 136 are substantially similar to one another. However, the fat material may contain greater amounts of liquid carbon dioxide. Nevertheless, lean meat particulates also contain amounts of liquid carbon dioxide. Both chimneys 122 and 136 are substantially similar in construction and operation. Chimneys 122 and 136 include an outer vessel 1222 and an inner vessel 1228. The outer vessel 1222 surrounds a portion of the inner vessel 1228 so that the outer vessel 1222 does not surround the inner vessel 1228 at a lower section. The inner vessel 1228 and the outer vessel 1222 define a space therebetween. The wall of the inner vessel 1228 is perforated where it is surrounded by the outer vessel 1222. The outer vessel 1222 includes an inlet nozzle 1226 at the upper section and an outlet nozzle 1224 at a lower section thereof. Carbon dioxide gas can be heated to about 60° F. and provided to the inlet nozzle 1226. Liquid carbon dioxide is maintained within the chimney at a predetermined level. The liquid carbon dioxide is removed via the outlet nozzle 1224 to maintain a level in the outer vessel 1222 and the inner vessel 1228. The inner vessel 1228 includes an inlet nozzle 1230 at a lower section thereof and an outlet nozzle 1236 at an upper section thereof. A helical screw conveyor 1232 is provided in a close fitting relationship within the interior of the inner vessel 1228. The helical screw conveyor 1232 is driven by driver 1242 and gearbox 1240. Helical screw 1232 is operated to transfer material introduced through inlet nozzle 1230 in an upwardly direction. The inner vessel 1228 has perforated walls to allow liquid carbon dioxide to be drained therefrom. The inner vessel 1228 begins to taper from a larger diameter to a smaller diameter at the upper section thereof. Likewise, the helical screw conveyor 1232 also tapers from a large diameter to a smaller diameter at the upper section thereof. By reducing the taper of the helical screw 1232 and the inner vessel 1228, the material carried therein will be compressed thereby squeezing liquid carbon dioxide from the material. Furthermore, the compression of the material at the tapering portion 1238 compresses the material sufficiently to act as a plug to maintain pressure within the outer vessel 1222. The tapered section of the inner vessel 1228 may be devoid of perforations. As the vessel 1228 has perforations in the walls thereof surrounded by the outer vessel 1222, the pressure is equalized between the inner vessel 1228 and the outer vessel 1222. The operating pressure of chimneys 122 and 136 is about 300 psig to about 800 psig. The operating pressure of chimneys 122 and 136 can be lower than the operating pressure of separator 120 so that material is transferred from separator 120 to chimneys 122 and 136 by the drop in pressure. The chimneys 122 and 136 are connected to the gaseous and liquid carbon dioxide distribution system, as will be described below, so the pressure in chimneys 122 and 136 can "ride" the pressure of the distribution system. Both lean meat particulates and fat particulates from the separator 120 are processed in a similar fashion in one of the chimneys 122 and 136. Gaseous carbon dioxide injected into inlet nozzle 1226 is provided by the carbon dioxide distribution system, while liquid carbon dioxide removed from nozzle 1224 is sent to or supplied by the liquid carbon dioxide distribution system. Heated gaseous carbon dioxide causes vaporization of some of the liquid carbon dioxide, which results in cooling, and removal of the carbon dioxide liquid from the solid particulate material through vaporization. Alternatively, if gaseous carbon dioxide is sufficiently cool, condensation of the gaseous carbon dioxide may result. Lean meat particulates or fat particulates are transferred out of the respective chimney 122 or 136 from the outlet nozzle 1236 to measuring devices, which is process block 124 for lean meat particulates and process block 128 for fat particulates. After measuring, lean meat materials are transferred to pump 126, while fat particulates are transferred to pump 140, as illustrated in FIG. 2.

The liquid carbon dioxide level maintained in the chimneys 122 and 136 is kept higher than the common outlet from the tubes 1202 and 1204. However, this is a consequence of an open, equalized carbon dioxide distribution system. In other carbon dioxide distribution systems, the liquid level in chimneys 122 and 136 may not need to be maintained higher than the exit of the tubes 1202 and 1204.

Pumps 126 and 140 are designed to operate in a reverse fashion. Because the pressure in the chimneys 122 and 136 is on the order of about 400 psi to 800 psig, which eventually needs to be reduced to atmospheric pressure for packaging, the pressure drop can be used to drive a generator connected to the rotor of the pump. The generator 128 is connected to pump 126, while the generator 142 is connected to pump 140. As the pressure drops in the conduit through which material traveling from the inlet of the pump 126 or 140 to the outlet of the pump 126 or 140, the drop in pressure results in the vaporization of carbon dioxide and an attendant increase in volume. Such expansion can be utilized to drive a gas turbine generators. Therefore, generators 128 and 142 can produce electricity which can be connected to a local power distribution system or fed into any utility line. The outlet of the pumps 126 and 140 is on the order of 100 psig. However, the pressure needs to be reduced to atmospheric. To this end, depressurization vessels 130 and 144 are provided downstream from pumps 126 and 140, respectively. Depressurization vessels 130 and 144 extract additional carbon dioxide in the form of gas which is introduced into the carbon dioxide distribution system.

Figure 7:
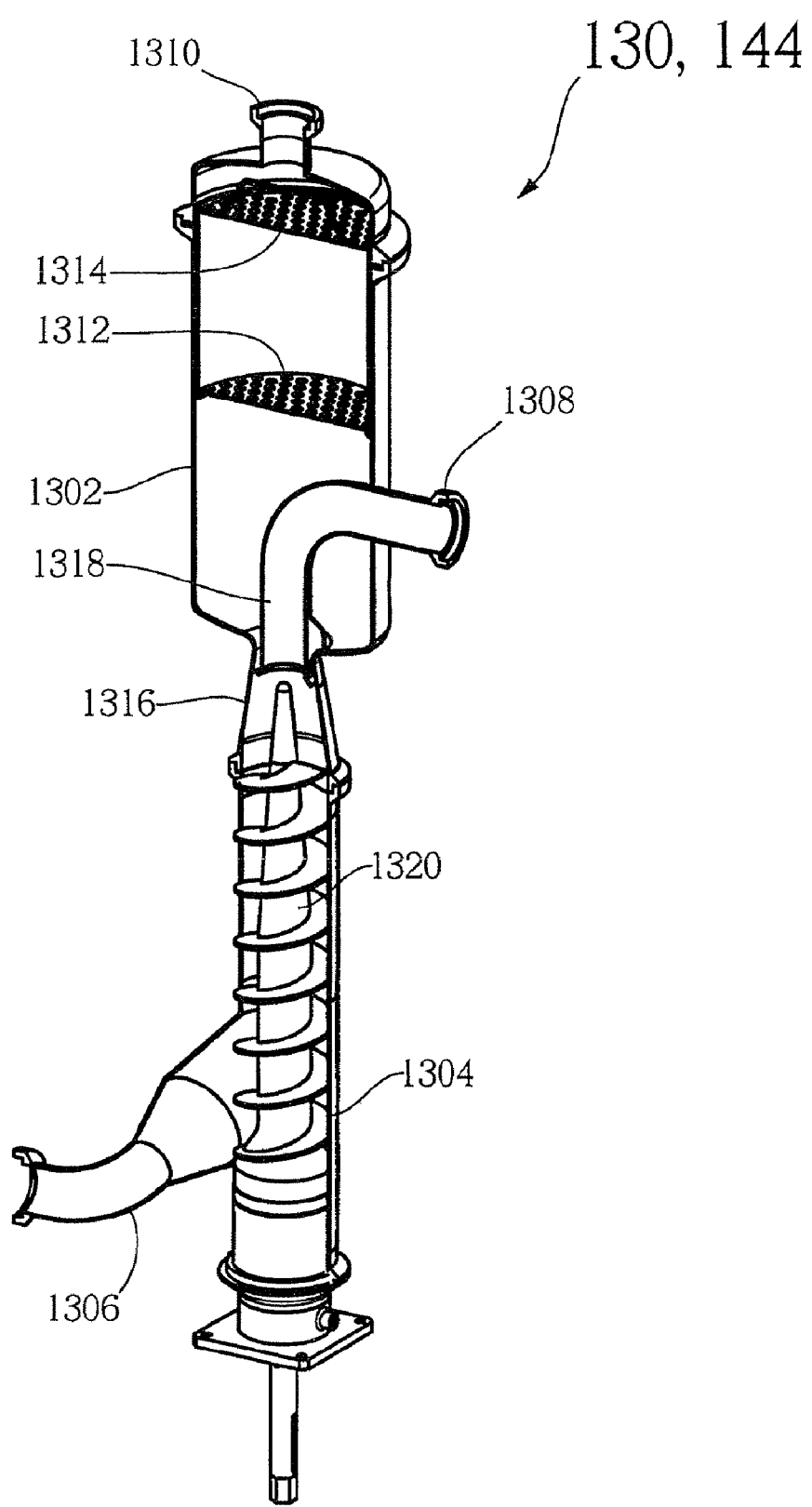
FIG. 7 is a diagrammatical illustration of apparatus in accordance with one embodiment of the present invention.

Referring to FIG. 7, depressurization vessels 130 and 144 are illustrated. Depressurization vessel 130 is for use with the lean meat particulate material, while depressurization vessel 144 is used with the fat particulate material. The construction and operation of depressurization vessels 130 and 144 is substantially similar to one another. The depressurization vessels 130 and 144 include an upper housing 1302 and a lower housing 1304. The lower housing 1304 includes a helical screw conveyor 1320. The helical screw conveyor 1320 is driven by a driver (not shown). Lower housing 1304 includes the inlet nozzle 1306 through which lean meat particulate material or fat particulate material is fed to housing 1304. Material introduced into housing 1304 is then conveyed via the screw conveyor 1320 through tapered conduit 1316 which enters upper housing 1302 and makes a 90° bend and exits at the outlet nozzle 1308. After leaving housing 1304, material being transferred therethrough is at atmospheric pressure. Gaseous carbon dioxide released during the drop in pressure flows into the upper housing 1302 around the bottom of conduit 1318. The upper housing 1302 includes one or more perforated grates, such as perforated grates 1312 and 1314. Grates 1312 and 1314 are placed at differing heights in the housing 1302 and substantially cover the entire cross-sectional area of the interior of housing 1302. Grates 1312 and 1314 prevent solid materials from being carried over or entrained with the gaseous carbon dioxide. Gaseous carbon dioxide leaves housing 1302 via upper outlet nozzle 1310 and is returned to the carbon dioxide distribution system. From depressurization vessels 130 and 144, particulate material is at atmospheric pressure and can now be packaged in respective suitable packages for lean meat particulates in process block 132 of FIG. 2 or in process block 146.

In another embodiment, a pair of (two) separators, similar to the apparatus shown in FIG. 5, can be arranged such that meat processed in a first separator can be transferred under pressure directly into a pre-blender, similar to the one of FIG. 4, via a sealed, gas tight first conduit, and a second stream of processed meat can be transferred under pressure from a second separator into the pre-blender. In this way, two streams of processed meat can be further measured, combined, and/or treated.

Figure 8:
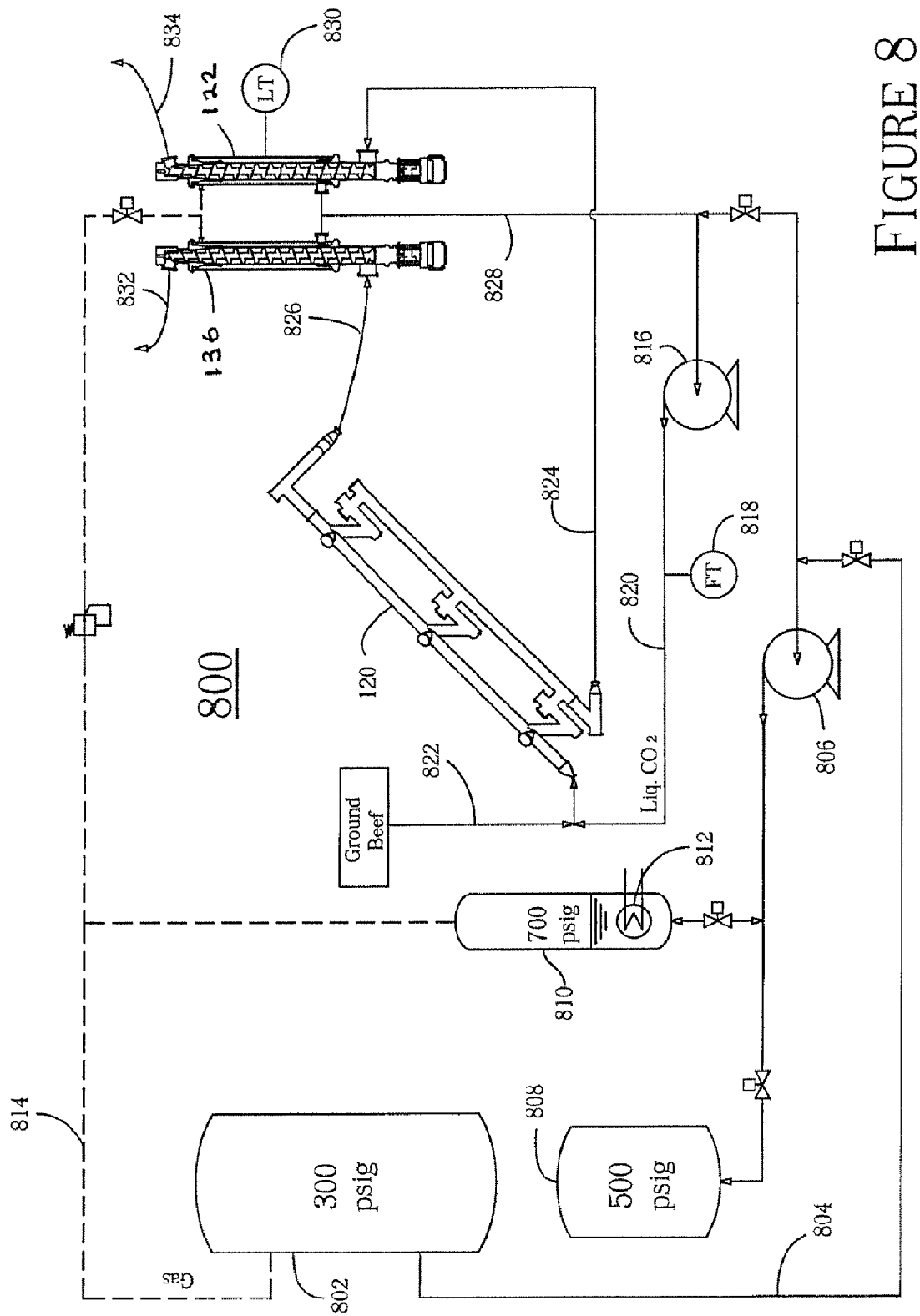
FIG. 8 is a diagrammatical illustration of apparatus in accordance with one embodiment of the present invention.

Referring to FIG. 8, a representative carbon dioxide distribution system for use with the above-described system is schematically illustrated. Carbon dioxide storage tank 802 is provided at a convenient location for intermittent refilling of the tank 802. The tank 802 is maintained at a pressure of about 300 psig. In this condition, the carbon dioxide can remain as a liquid at a temperature of 60° F. Liquid carbon dioxide line 804 leads from tank 802 to a pressure booster pump 806 which boosts the pressure of liquid carbon dioxide to a pressure of about 500 psig to 700 psig for delivery to tanks 808 and 810. Tank 808 contains liquid carbon dioxide at about 500 psig. Tank 810 contains liquid carbon dioxide at a pressure of about 700 psig. Tank 810 includes a heater 812 to maintain the pressure at 700 psig by increasing the temperature. Each vessel 808 and 810 can have a pressure relief valve which vents into a gaseous carbon dioxide header 814 which returns to storage tank 802. The 300 psig pressure line 804 connects to the liquid outlet nozzle 1224 on chimneys 122 and 136. Liquid carbon dioxide from chimneys 122 and 136 that is drawn from the outlet nozzle 1224 passes via line 828 to the 300 psig liquid carbon dioxide line 804. A level transmitter 830 controls the amount of liquid carbon dioxide that is withdrawn from chimneys 122 and 136 to maintain a constant level. A takeoff line from the 300 psig liquid carbon dioxide line leads to booster pump 816. Booster pump 816 increases the pressure from about 300 psig to about 500 psig for pumping into the separator 120. A flow meter 818 is provided in line 820 to measure the amount of liquid carbon dioxide flow into the separator 120. This higher pressure liquid carbon dioxide is combined with the ground particulate material line 822 including both fat particulate material and lean meat particulate material. As discussed above, liquid carbon dioxide exits both with the separated lean meat particulate material in bottom line 824 and with the fat particulate material via overhead line 826. Bottom line 824 connects to outlet nozzle 1242 of tube 1206 (FIG. 5). Overhead line 826 connects to common outlet nozzle 1244 of tubes 1202 and 1204 (FIG. 5). Gaseous carbon dioxide added to chimneys 122 and 136 is fed from the gaseous carbon dioxide header 814 which is connected to the storage tank 802.

Figure 9:
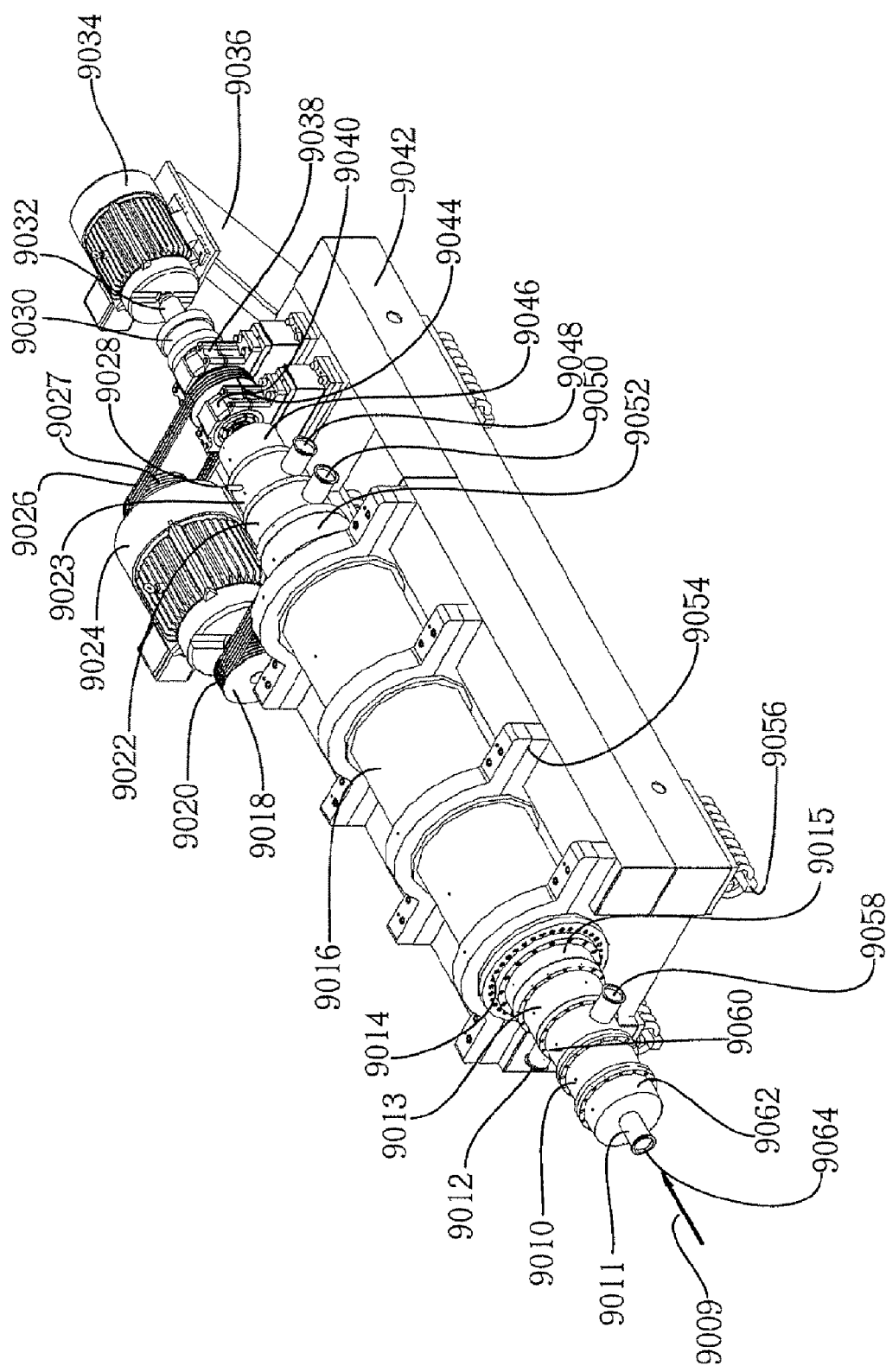
FIG. 9 is a diagrammatical illustration of apparatus in accordance with one embodiment of the present invention.

Referring to FIG. 9, a diagrammatical illustration of a centrifuge for use as an alternative separator in process block 120 (FIG. 2) is provided. A rigid steel base 9042 with shock absorbing floor contact mounting members, such as 9056 is arranged to retain an assembly comprising a horizontal cover 9016 rigidly held in place by suitable brackets, such as 9054, and collectively housing a decanter style centrifuge bowl which cannot be seen in this illustration. The bowl is arranged to rotate at a speed generating a centrifugal G force of about 3000 or more; however, to separate fat from lean meat, the speed of the rotating enclosed bowl may be limited to just a few hundred rpm, exerting a centrifugal force of a few hundred G or less. A relatively low G force on the order of 30 to 100 G can provide sufficient force to quickly separate fat from lean meat, maintained at a temperature of approximately 32-34° F. A series of annular collars with interposed manifold segments and extraction ports connected directly to the manifolds are arranged in such a manner that a sealed enclosure is maintained within the above centrifuge bowl. A segment 9062 is attached directly to an adjacent segment 9010 which in turn is attached in a sealing manner to manifold 9060 which in turn is attached in a sealing manner to manifold 9013 which in turn is attached to innermost annular segment 9015 which is attached by a plurality of screws tightened adequately and attaching the annular segment 9015 directly to the enclosure cover 9016. Extraction port 9012 is connected directly to manifold 9013 through which separated fluid, such as liquid carbon dioxide, is extracted after separation. Port 9012 is connected directly to a conduit pressurized so as to enable the efficient extraction of fluid or liquid carbon dioxide and carry the fluid or liquid carbon dioxide to a positive displacement pump controlling the flow of the fluid at a rate as to maintain a quantity of liquid carbon dioxide within the centrifuge bowl which will enable the efficient separation of lean meat and fat in separate stratified layers wherein the lean meat will be stratified in an outer layer and the fatty tissue, fat, or adipose tissue shall be stratified in an inner layer adjacent to a stratified layer of liquid carbon dioxide. More particularly, the layer of liquid carbon dioxide will stratify between the inner layer of fat and the outer layer of lean meat such that the excess and liquid carbon dioxide can be extracted via port 9012 in a controlled pressurized enclosed process. Port 9058 is attached directly to manifold 9060 which in turn connects to the termination point of the inner Archimedes screw (shown as 11381 in FIG. 11 below) mounted within the centrifuge bowl and provided to extract the stratified fat which is transferred to manifold 9060 and then through conduit 9058. Conduit 9058 is most preferably connected directly with a positive displacement pump arranged to control the transfer of fat at a mass flow rate that corresponds to the mass flow of blended goods in conduit 9064 in the direction shown by arrow 9009. Annular segment 9052 is attached to the alternate end of enclosure 9016 and in turn is attached to manifold 9022. In turn manifold 9022 is attached to manifold 9023. Manifold 9022 is fitted with an extraction port 9050 connected directly thereto, and manifold 9023 is fitted with an extraction manifold 9048. An additional port 9028 is attached also to manifold 9023. Manifold 9023 is fixed rigidly to annular segment 9046. A rigid fixed sealed enclosure, horizontally disposed and having a round cross section comprising said centrally disposed cover 9016 of tubular profile, connects with annular segments and manifolds comprising two sets, one at each end of cover 9016 and all rigidly fixed and directly or indirectly attached and fixed via brackets, such as 9054 to said steel base frame 9042 and in such a manner that said centrally located shaft 9011 is mounted via suitable bearings and seals in such a way that main drive electric motor 9024 and spiral drive motor 9034 bear directly thereon via direct coupling at 9032 for drive motor 9034, and a first drive belt 9020 and second drive belt 9026 connecting said electric motor 9024 via pulleys 9018 and 9026 located at opposing ends of said electric motor 9024, attached to a common drive shaft centrally disposed. A centrally and horizontally disposed shaft 9011 is located at the center of all said manifold and annular segment members attached to cover 9016 wherein said shaft 9011 comprises conduit 9064 at the input end of said centrifuge connecting directly to drive shaft 9032 which in turn connects directly to drive motor 9034. Central shaft 9011 comprises additionally two concentric spiral Archimedes screws including an inner spiral screw capable of transferring solids from a centrally disposed region of centrifuge bowl within cover 9016 with an outer Archimedes screw also rigidly concentrically connected with central shaft 9011 and the first spiral Archimedes screw and having an outer profile in virtual contact with the inner surface of the bowl wherein the virtual contact is saved only by a small clearance arranged to enable the effective transfer of solids or viscous fluids that accumulate in contact with the inner surface of the bowl. The outer screw in close virtual touching proximity to the inner surface of the centrifuge bowl is arranged to transfer stratified goods from within the bowl ultimately to manifold 9022 and through the extraction port 9050. Goods accumulating via stratification and subsequently in direct contact with the inner surface of the centrifuge bowl will be transferred by the outer Archimedes screw to space within manifold 9022 and subsequently through port 9050 which is in direct communication with a controlled positive displacement pump. Goods transferred through port 9050 include lean meat having substantially reduced fat content. Whereas the inner concentric screw is arranged to transfer goods that have accumulated at the innermost and central region of the centrifuge bowl toward and then into the enclosure of manifold 9013 and subsequently are extracted via port 9012. Motor 9024 is arranged to drive centrally disposed concentric screws and shaft 9011 at a speed so as to enable the rapid and effective separation of fat which accumulates in a region facilitating extraction by transfer of the innermost spiral Archimedes screw through manifold 9013 and port 9012. However lean meat is transferred by the outer Archimedes screw after accumulation against the inner surface of the centrifuge bowl and into manifold 9022 prior to extraction via port 9050. Therefore, a blend of boneless meat and fluid comprising liquid carbon dioxide and optionally water and any other matter, such as sodium chlorite, is pumped by injection in the direction shown by arrow 9009 into conduit 9064 of shaft 9011. Shaft 9011 and concentric Archimedes screws rotate at a greater speed than bowl within enclosure 9016. This speed differential between the shaft and screws assembly and bowl located within cover 9016 is provided by drive electric motor 9034 via a radial gearbox 9030 wherein an output drive is connected to the bowl while the reducer 9030 is attached directly to shaft 9032 in such a way that drive motor 9034 ordinarily rotating at the same speed as determined by drive motor 9024 provides an increased speed of rotation by a number of revolutions per minute of the inner shaft 9011 and concentric Archimedes screw assembly relative to the outer centrifuge bowl. In this way, the blend of ground meat and liquid carbon dioxide fluid with optional water and sodium chlorite in solution, pumped at a predetermined mass flow through conduit 9064 in the direction shown by arrow 9009 is released after transfer into a central disposition within the bowl, after a residence time of approximately 30 seconds, the lighter solid or fluid content of the slurry injected therein accumulates at a centrally disposed region of the bowl while the heavier solid or fluid matter component of the slurry pumped into the bowl will accumulate at an outermost stratified annular region and in contact with the inner surface of the centrifuge bowl, thereby enabling the outer concentric Archimedes screw to transfer the heavier solids and fluids into manifold 9022 and then through port 9050. Water or any other fluids as may be selected to enhance performance of the process can be injected via port 9028. For example, a clean and pure quantity of liquid carbon dioxide can be transferred through port 9028 to provide for a processing capability that will be explained more thoroughly in association with subsequent figures. Meanwhile fluids contained in the slurry injected via conduit 9064 are extracted by positive displacement pumping means through extraction port 9058 controlled at a mass flow rate so as to maintain the stratified level of each layer of goods within the bowl at a suitable level. Pressurized and dense phase gas can be pumped via a positive displacement pump into port 9048 under certain temperature and pressure conditions required within the bowl. However, in other more extreme conditions caused by controlled elevated temperature, carbon dioxide gas may be extracted via port 9048. A purpose of transferring gas in either direction via port 9048 is to provide for a more effective separation of solids. Any gas present within the bowl housed within cover 9016 will most likely be the least dense of any fluid within the bowl and will occupy a space closest to the centerline of the bowl parallel with the longitudinal sides of the bowl. More particularly, the gas within the bowl may be derived from liquid fluid such as liquid carbon dioxide present within the bowl or alternatively, injected into the bowl via a suitably located port such as port 9048 but whichever way gas is provided within the bowl it shall occupy a space of tubular profile and a substantially round cross section wherein sides of the tube are parallel with the sides of the bowl. The space occupied by the gas is displaced by the central shaft and wherever sections of the Archimedes screws attached thereto intersect the gas. The centrally disposed space filled with gas can assist in the separation of solids or fluids and will fill the centrally disposed region located at the innermost region and adjacent to an outer stratified layer of the next lightest matter which shall form a layer around the gas region during operation of the centrifuge. Furthermore, the heaviest component injected via port 9064 occupies a stratified space comprising a layer in contact with the inner surface of the rotating bowl. It is preferable that a fluid has a density less than the heaviest component of the blend and greater than the lighter component of the blend. A fluid such as liquid carbon dioxide can be used to enable separation of fat from lean meat. Lean meat having a density of approximately 66 lbs/cu. ft. accumulates in the region immediately adjacent to the inner surface of the bowl. Liquid carbon dioxide having a density of approximately 59 lbs/cu. ft. will accumulate in a stratified annular space immediately against the inner surface of the outer lean meat and immediately at the outer surface of an inner stratified layer of fat having a density of approximately 55 lbs/cu. ft. When gas is present, which may comprise dense phase carbon dioxide gas having a density of about 60 lbs/cu. ft., it will occupy a space closest to the center of said bowl during operation. It can therefore be readily understood that when a blend of ground meat, comprising approximately lean meat and fat and liquid carbon dioxide maintained at a temperature of approximately 32° F. and a pressure of 885 psia, is transferred through port 9064 in the direction shown by arrow 9009 at a mass flow rate of approximately 100 gallons per minute, for example, lean meat with a reduced component of fat and carbon dioxide will be extracted via port 9050, and fat with substantially reduced lean beef content will be extracted via port 9012. Liquid carbon dioxide is extracted via port 9058 and can be recycled after blending with ground meat of selected lean content and returned with blended ground beef via port 9064 in the direction shown by arrow 9009. The drive mechanism comprises two electric motors wherein the main bowl drive means, electric motor 9024, transmits the driving force independently to the bowl via transmission belt 9020 and pulley 9018 and the Archimedes screws are driven by transmission belt 9026 and pulley 9027 with pulley 9044 fixed to main Archimedes screw shaft and retained between bearing blocks 9040 and 9038 and in such a manner that an end of the shaft fixed to the Archimedes screws is connected to motor 9034 mounted upon bracket 9036 via drive shaft 9032. Drive shaft 9032 is connected to a suitable planetary gearbox 9030 which in turn is attached to a tube rotating about the drive shaft at the same speed as the bowl to which it is coupled via timing belts 9026 and 9020. Therefore, in this way said Archimedes screws can be driven at a speed greater than the rotational speed of the bowl. For example, the bowl may rotate at 500 rpm, and the Archimedes screws may rotate at 590 rpm. In this example, the differential between the shaft speed driving said Archimedes screws and the speed at which the bowl rotates, is 90 rpm. It should be noted that such differential can be adjusted to suit the optimum production rates as required and may be adjusted by interchanging the gear ratio of gearbox 9030.

Figure 10:
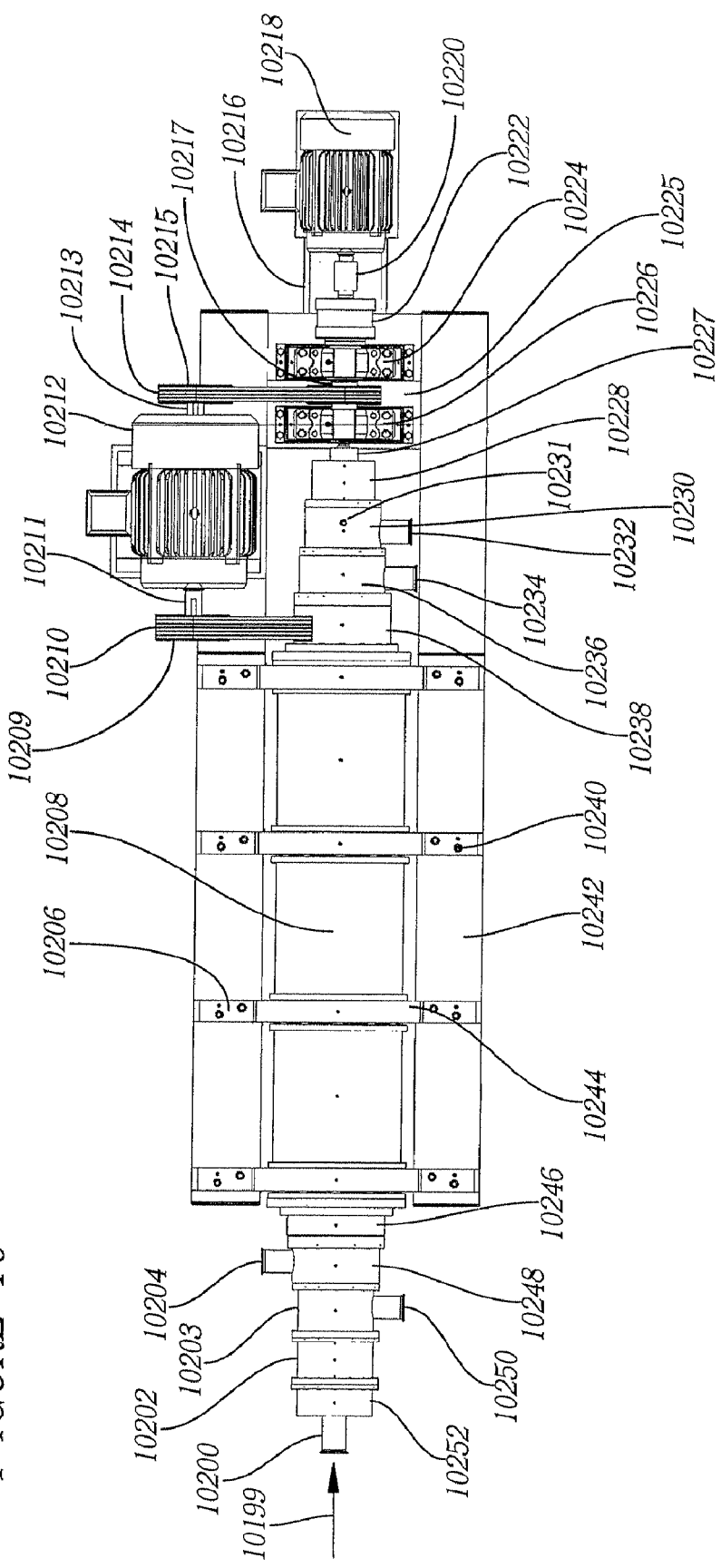
FIG. 10 is a diagrammatical illustration of apparatus in accordance with one embodiment of the present invention.

Referring now to FIG. 10, a plan view of the centrifuge apparatus as described in association with FIG. 9 is shown. A rigid base frame 10242 provides a solid base to which the centrifuge assembly with central cover 10208 is mounted via brackets such as 10244 at mounting point such as 10206 and a series of bolts such as 10240. In this way, a centrally mounted rigid cover 10208 is held rigidly and bearing blocks 10226 and 10224 are mounted to suitably machined mounting pads such as 10225. Planetary gearbox 10222 is attached to a sleeve rotating about a central shaft 10220 which in turn is connected directly to Archimedes screw drive motor 10218. Drive motor 10218 is mounted to bracket 10216 and rigidly fixed via bolts to a machined mounting pad representing a horizontal surface rigidly fixed to frame 10242 via bracket 10216. Electric drive motor 10212 is rigidly mounted to base frame 10242 and comprises a drive shaft 10211 with a first bowl driving pulley 10209 fixed to a first drive 10211 with transmission timing belt 10210 providing the main drive to the centrifuge bowl. A second pulley 10215 mounted rigidly to a second end to electric motor 10212 drive shaft at 10213 with timing belt 10214 transmitting drive to a pulley mounted rigidly to outer drive tube 10217 which in turn is fixed at an end to planetary gearbox 10222. Drive shaft 10220 is centrally located providing driving force to Archimedes screws mounted to the central shaft within outer drive tube 10217. Differential speed between Archimedes screws enclosed and sealed within the bowl housed within cover 10208 and the Archimedes screws, is provided by electric motor 10218 which can be adjusted by varying the speed at which the motor 10218 drives the shaft 10220. Shaft 10220 is rigidly mounted effectively between the outer centrifuge bowl driven via pulley 10210 attached to variable speed electric motor 10212 thereby enabling a variable speed of the Archimedes screws relative to said centrifuge bowl. The speed of the Archimedes screws is variable relative to the bowl which is driven by the variable speed electric motor 10212. Shaft 10200 comprises the extreme opposite end of a continuous shaft connected directly to drive shaft 10220. Central Archimedes drive shaft 10200 is typically gun drilled to a selected depth enabling the injection of primary blend of goods, such as ground meat blended with liquid carbon dioxide in the direction shown by arrow 10199. Conduit within shaft 10200 provides for the transfer of the fluid goods into the centrifuge. Sealing covers are fixed by fixtures so as to enclose a series of conduits enabling the transfer of separated components away from the centrifuge after separation has occurred therein subsequent to transfer of the primary blended fluid transferred therein in the direction shown by arrow 10199. Outer cover 10252 is provided with a seal about rotating shaft 10200 so as to substantially prevent the escape of any fluids or solid component of the goods being processed, at a first side and attached rigidly via suitable fixtures at a second side to adjacent cover 10202 which in turn is fixed rigidly and sealed to manifold 10203 with port 10250 attached thereto. Port 10250 corresponds with the port 9058 shown in FIG. 9. Port 10204 corresponds with port 9012, as shown in FIG. 9 and described herein above. Manifold 10248 is rigidly fixed to manifold 10203 at a first side and at a second side is sealed by rigid attachment to cover 10246. Cover 10246 is rigidly attached and sealed at the attachment to bowl cover 10208 which in turn is attached to cover 10238. Cover 10238 is machined so as to enable the connection of the centrifuge bowl to drive shaft 10211 of variable speed electric motor 10212 via transmission timing belt 10210. Manifold 10236 is sealingly fixed to cover 10238 at a first side with extraction port 10234 connected directly thereto and sealingly attached at a second side to annular manifold 10230. Extraction port 10234 corresponds with port 9050, as shown in association with FIG. 9. Manifold 10230 is directly attached to port 10232 with a first side attached to manifold 10236 and a second side sealingly attached to end cover 10228. Extraction port 10232 corresponds with port 9048 in association with FIG. 9, and port 10231 is arranged to allow the injection of fresh liquid carbon dioxide having no impurities therein so as to connect with central shaft enabling the transfer of the fresh liquid carbon dioxide (or any other fluid) through a series of ports and ultimately into the closest end cone "beach" region within the centrifuge. Port 10231 corresponds with port 9028 in FIG. 9. End cover 10228 is provided with a sealing mechanism about central shaft at 10227. End cap 10228 corresponds with end cap 9046 as shown in FIG. 9, and end cap 10252 corresponds with end cap 9062 in FIG. 9 and conduit 10200 as shown in FIG. 10 corresponds with conduit 9011 as shown in FIG. 9.

Figure 11:
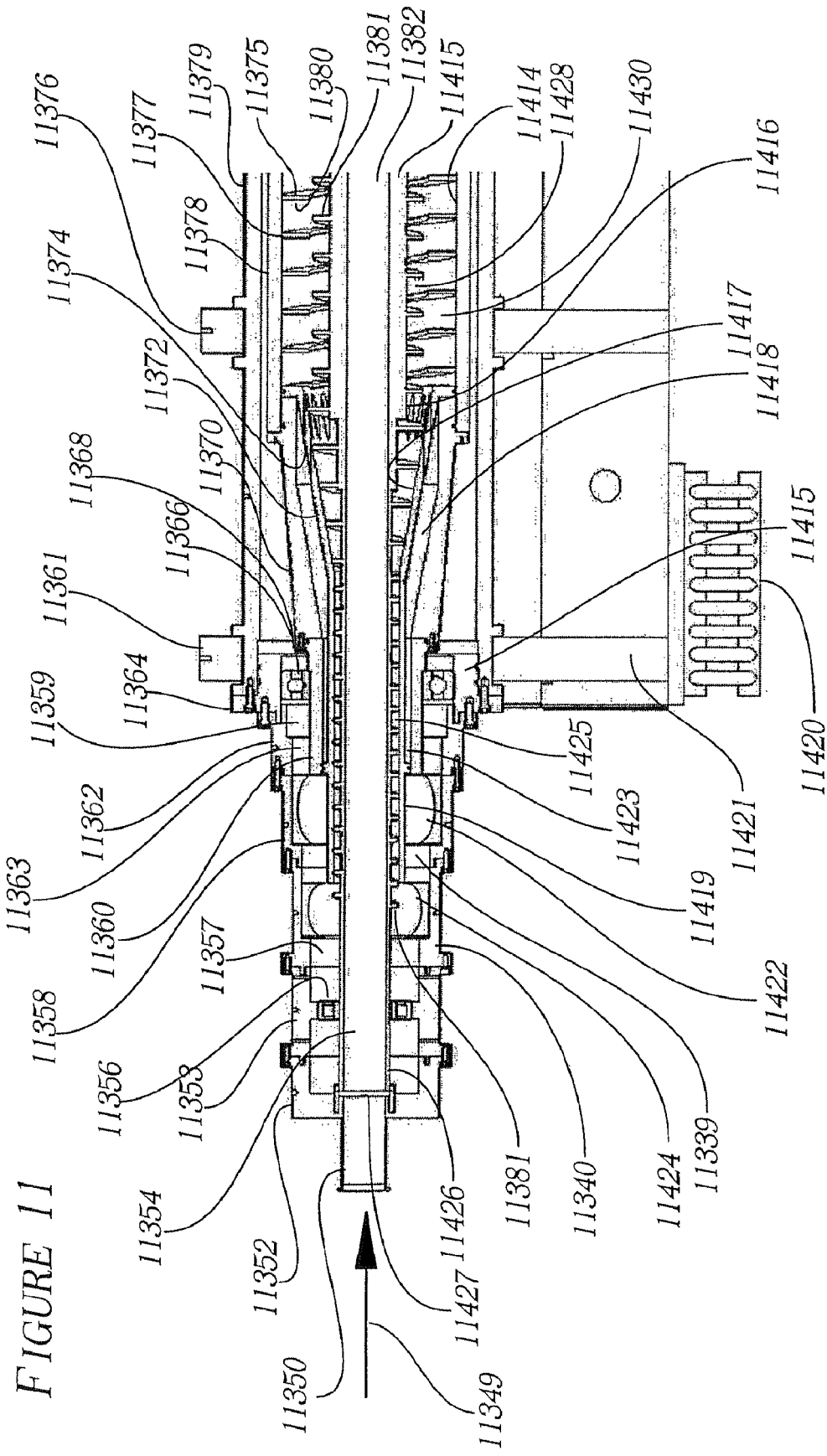
FIG. 11 is a diagrammatical illustration of apparatus in accordance with one embodiment of the present invention.

Referring now to FIG. 11, a cross section through a portion of the centrifuge as described in association with FIGS. 9 and 10 is shown. For ease of identification, components are enlarged and the input end of the centrifuge only is shown in FIG. 11. In order to provide a thorough comprehension of this view, it should be noted that the cross-sectional view shown in FIG. 11 includes a cross section extending from the input port 11350 which is equivalent to input port 10200 in FIG. 10 to an imaginary line dissecting the centrifuge at a point shown by that point identified as 10208 in FIG. 10 or 9016 in FIG. 9. Rigid frame 11421 mounted to shock absorbing pad 11420 is rigidly fixed to an outer annular cover 11379 by containment within brackets 11361 and 11376. In turn, bowl 11378 is connected and sealed to end cone 11370 which in turn is attached to member 11360. Cone shaped profile 11370 encloses an annular cone shaped cavity 11418 which is in turn enclosed by annular tapered section 11372 which terminates at its connection with tube 11419 enclosing the parallel screw section of Archimedes screw 11381 which is the inner Archimedes screw provided to transfer stratified goods through conduit 11419 after separation from substantially all other fluids as Archimedes screw 11381 carries goods up beach inner surface 11417 and then into conduit space such as 11425 and into manifold space 11424. Manifold space 11424 corresponds with space of manifold 11203 as shown in FIG. 10. End cover 11352 is provided with a seal 11427 enabling inner conduit 11350 to rotate freely while in direct sealed connection with conduit section 11350 enabling transfer of goods, such as ground meat, blended with other fluids through end conduit section 11350 in the direction shown by arrow 11349. Such goods are transferred under controlled pressure and mass flow according to the controlled pumping rate of the pump such that the goods can be transferred in the direction shown by arrow 11349 under pressure, such as 700 psig through conduit 11350 and into conduit space 11354 within conduit section 11426. Conduit space 11354 within conduit shaft 11426 is connected directly to shaft 11415 about which two concentric Archimedes screws comprising inner screw 11381 and outer screw 11380 are connected directly thereto. Shaft 11414 comprises a rigid constructed fabrication of preferably stainless steel with Archimedes screw 11381 arranged to transfer separated adipose fatty tissue or fat from the inner stratified location in space 11428 toward manifold space 11424. The stratified innermost fatty tissue located in space 11428 is transferred within cone profile of end cone 11372 having an inner surface 11417 typically known as a "beach." Stratified fluids, such as carbon dioxide in liquid condition, held at a pressure of approximately 700 psig is extracted through a series of apertures arranged in an annular formation around the mouth of the cone 11372 and arranged to allow fluid to be extracted from space 11430 and at a controlled rate via manifold space 11418 communicating directly with annular space 11423 and terminating at manifold 11358 inner space 11422. A roller bearing 11356 is arranged to retain conduit shaft 11426 within outer housing cover 11353. A seal 11357 is located between shaft 11426 and manifold 11340 so as to prevent any matter contained within space 11424 escaping there from. An additional seal is provided at 11339 to prevent the escape of fluid retained within manifold 11358 space 11422. An additional seal 11363 is provided to prevent escape of fluids or any matter contained within manifold 11358 space 11422, and into space 11359 within annular cover 11362. Ball bearing 11366 is located within annular member 11415 which maintains the rigid yet free rotating of member 11370 and those components attached thereto such as bowl 11378. An annular plate 11368 is located and fixed rigidly to tube section 11360 at its connection point to member 11370. Archimedes screw 11380 is rigidly fixed to Archimedes screw 11381 which in turn is rigidly fixed to central shaft 11415 to provide a single component retained within bowl 11378 and in such a manner that the outer edge 11377 of Archimedes spiral member such as 11375 is in very close proximity to the inner surface 11414 of bowl 11378. It can therefore be seen that blended goods such as a combination of ground meat and liquid carbon dioxide transferred through conduit 11382 in the direction shown by arrow 11349 and ultimately into spaces such as 11428 and 11430 will stratify, and adipose fat or fatty tissue can be transferred by Archimedes screw 11381 into manifold space 11424, and lean beef will be transferred by Archimedes screw 11375 in the opposite direction and in the direction shown by arrow 11349.

Figure 12:
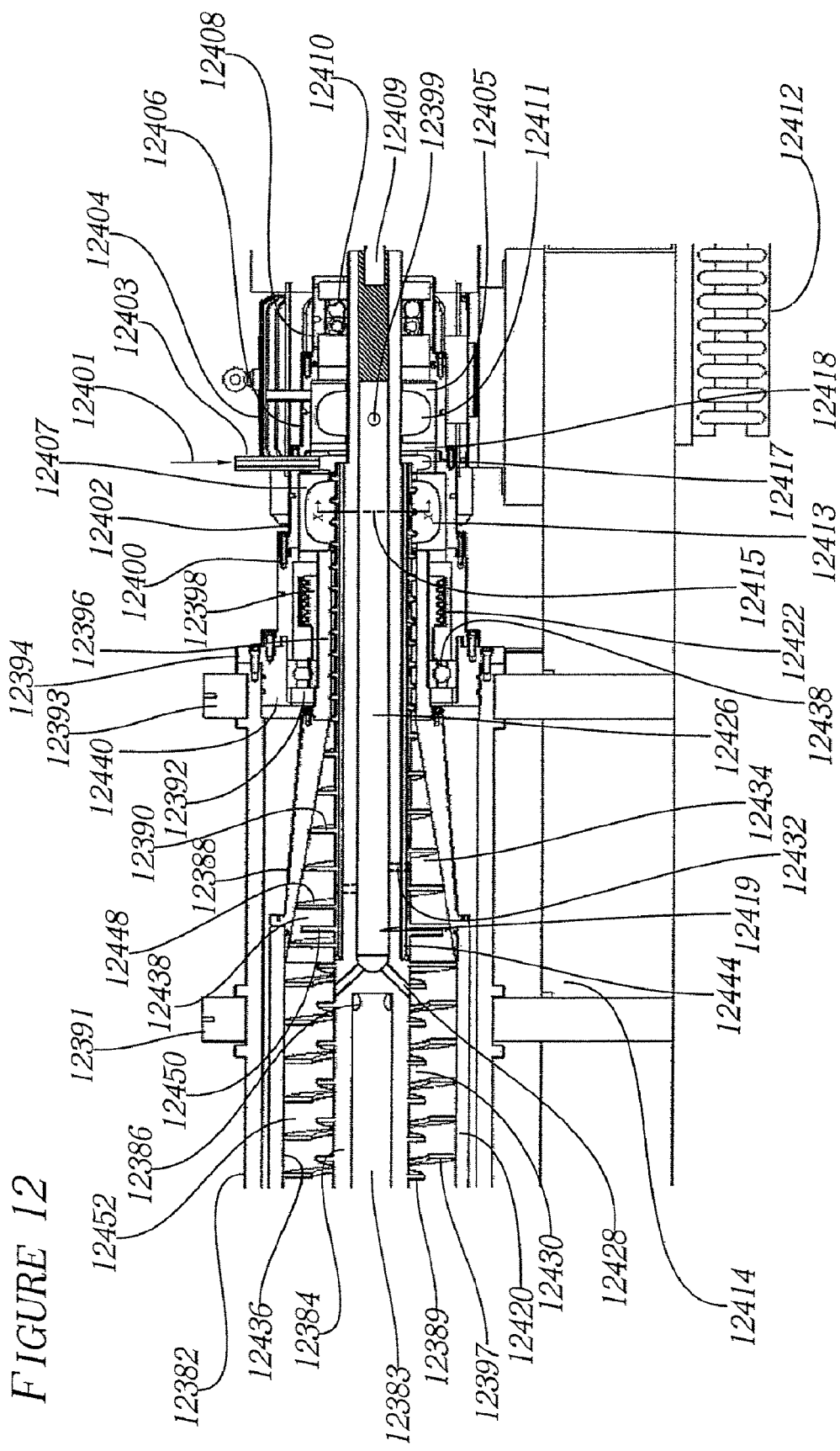
FIG. 12 is a diagrammatical illustration of apparatus in accordance with one embodiment of the present invention.

Referring now to FIG. 12, a cross section through the apparatus as shown in association with FIGS. 9 and 10 wherein the cross-sectional view is of a vertical plane passing through the centerline of shaft 12384 is shown. This view shows the other half of the apparatus shown in FIG. 11. When FIG. 11 and FIG. 12 are placed end to end with the right hand side of FIG. 11 adjacent to the left hand side of FIG. 12, a cross section through the entire length of the centrifuge can be seen such that goods transferred in the direction shown by arrow 11349 in FIG. 11 are transferred into conduit 12383 in shaft 12384 as shown in FIG. 12. Goods transferred into conduit 12383 are dispersed through radially drilled holes such as 12386 provided in shaft 12385. The continuation of outer Archimedes screw 11380 in FIG. 11 can be seen in 12397 in FIG. 12. Similarly, inner Archimedes screw 11381 as shown in FIG. 11 is a continuation of inner screw 12389 in FIG. 12. Outer cover 12382 is rigidly mounted via brackets 12391 and 12393 to base 12414 which is rigidly mounted to shock absorbing pads 12412. Drive shaft 12384 is attached to a variable speed electric drive motor not shown via key 12409. Electric motor 12404 is arranged to drive bowl 12420 and tapering end member 12388 connected via conduit segment 12396 to pulley 12398 via a transmission drive belt 12422. Electric motor 12404 is provided with a variable speed feature and arranged to ensure that the rotational speed of bowl 12420 is different to the rotating speed of shaft 12384 with attached Archimedes screws. Port 12399 in shaft 12384 communicates directly with space 12411 of manifold 12405 which in turn connects with conduit 12426. Ports such as 12428 therefore enable the transfer of gas such as dense phase carbon dioxide gas into space 12430. Ports such as 12432 allow gas to be transferred into space such as 12434. Alternatively, excessive gas generated within space such as 12430 can be transferred there from via conduit 12428 drilled in shaft 12384 and subsequently through conduit 12426, ports such as 12399 and into space 12411 under controlled pressure determined by a suitable positive displacement pump connected by a port connected with space 12411. In this way, a suitable gas such as gaseous carbon dioxide can be maintained at a selected proportion as required within space 12430. Lean meat accumulated against the inner surface 12436 of bowl 12420 can be transferred into manifold 12407, space 12413. Bearing 12438 is arranged to enable the free rotation of hollow shaft 12396 while the hollow shaft 12396 is held rigidly in place relative to annular ring 12440. Annular ring 12396 is attached to member 12388 and bowl 12436 rigidly such that bowl 12436 rotates with pulley 12398 driven by motor 12404. A conduit 12403 is attached with direct communication to a positive displacement pump so as to enable the pressurized transfer of a controlled mass flow quantity of liquid carbon dioxide in the direction shown by arrow 12401 and into manifold space 12417. Manifold space 12417 connects to conduit 12444 which comprises one of several radially gun drilled conduits which allow the transfer of liquid carbon dioxide into spaces such as 12448. A flat disc member 12450 is attached rigidly to shaft 12384 such that a peripheral space is provided between flat disc 12450 outer edge and member 12388 inner surface. Disc like plate 12450 is arranged to restrict flow of lean beef around its periphery and into space 12448 from space such as 12452. Archimedes screw 12397 rotates and carries lean beef goods toward manifold space 12413 and through said space around disc 12450. Liquid carbon dioxide can be transferred via port 12403 and into space 12448 so as to displace any other fluids, such as water or salt solutions, with the lean meat as it is carried along the inner surface of member 12388 toward manifold space 12413.

Figure 13:
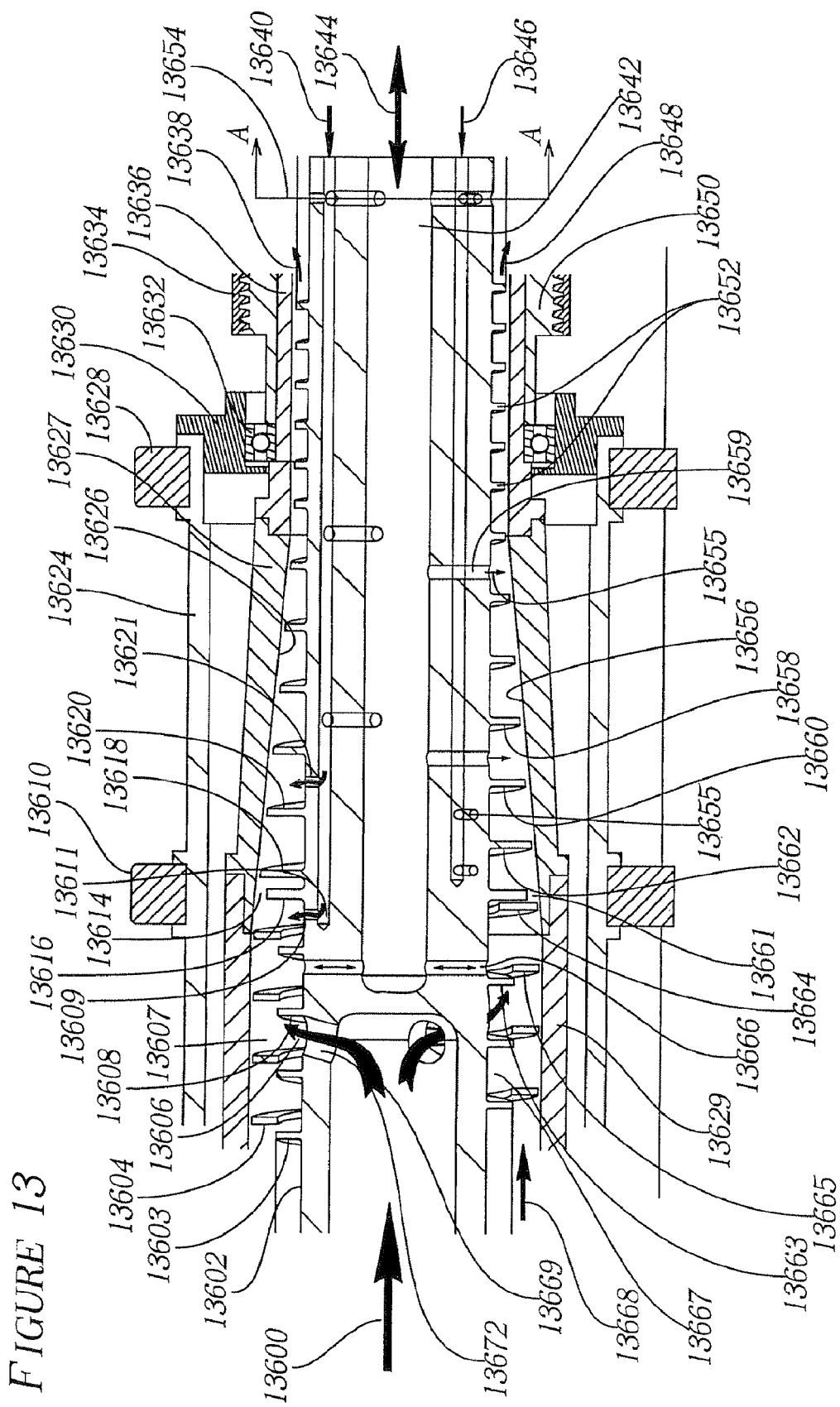
FIG. 13 is a diagrammatical illustration of apparatus in accordance with one embodiment of the present invention.
Figure 15:
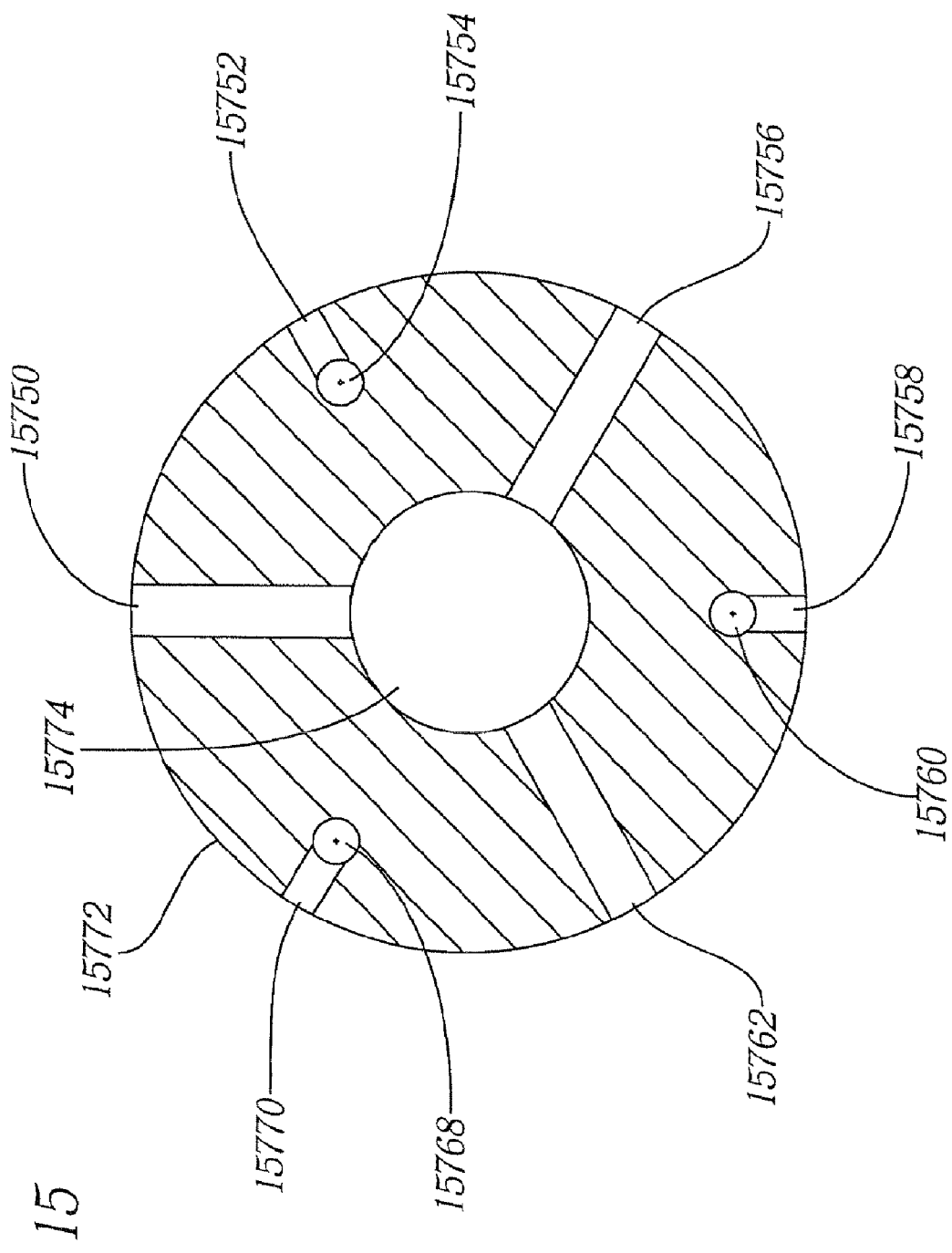
FIG. 15 is a diagrammatical illustration of apparatus in accordance with one embodiment of the present invention.

Referring to FIG. 13, a section of a centrifuge is shown. The cross section shown in FIG. 13 is a segment including a section of the bowl 13629 which compares with the bowl 12420 as described in connection with FIG. 12 and a pulley 13650 with timing belt 13634 which compares with pulley 12398 and timing belt 12422 as shown in FIG. 12. A cross section "AA" through a vertical plane 13654 is shown in FIG. 15. The cross section shown in FIG. 13 is of a vertical plane passing through the centerline of cover 9016 shown in FIG. 9 which compares with cover 13624 in FIG. 13. Shaft 13602 with conduit enabling transfer of goods in the direction shown by arrow 13600 in FIG. 13 shows the termination of conduit 9064 shown in FIG. 9 where arrow 9009 can be compared with arrow 13600 pointing in the same direction. The segment of outer cover 13624 shown in FIG. 13 compares with an end section of cover 9016 closest to pulley cover 9052 in FIG. 9.

In this embodiment, a disc 13616 is fixed to central shaft 13602 at the inner region of tapering member 13627 with beach surface shown as 13626 and 13656. Member 13616 may be fixed to shaft 13602 in such a way to provide a peripheral gap shown as 13614 and 13661 in FIG. 13 with outer Archimedes screw with spiraling member shown as a series of members such as 13604, 13618, 13620, 13658, 13660, 13662, 13664, and 13665. Outer Archimedes screw extends in close proximity to beach surfaces 13656 and 13626 and following the inner surface of bowl 13629 then tapering member 13627 which connects with parallel sided conduit 13636 shown in FIG. 13. Archimedes screw members such as 13652 comprise segments of the outer Archimedes screw which can facilitate the transfer of goods held in contact with the inner surface of bowl 13629 during normal operation of the centrifuge represented in FIG. 13 after separation from goods transferred into spaces such as 13667 and 13607 via conduit 13602 in the direction shown by arrows 13600 and through aperture 13672 in the direction shown by arrow 13669 and in such a way that the separated component which in this instance can be lean meat held by centrifugal force held against the inner surfaces of bowl 13629 such that when central shaft 13602 rotates relative to outer bowl member 13629, the lean meat is transferred in the direction shown by arrow 13668 and through space 13661 or 13614 and then along the inner surfaces 13626 and 13656 of member 13627 and finally in the direction shown by arrows 13648 and 13638 after transfer by Archimedes screw members such as 13652. The centrifuge can be used to separate solids from fluids using such liquid as compressed liquid carbon dioxide under controlled temperature and pressure conditions. Controlled conditions are maintained within the spaces shown in FIG. 13, for example, spaces 13607 and 13667. However, it may be desirable to elevate the density of liquid carbon dioxide by means other than elevating pressure with reduced temperature. A method of increasing the density of fluid blended with ground beef can be achieved by providing a fluid comprising a first component of liquid carbon dioxide and a second component of, for example, sodium chlorite in solution wherein the solution of water and sodium chlorite is added in such proportions so as to limit the sodium chlorite concentration such that it does not exceed between 500 and 1200 parts per million concentration, and even though it may be desirable to exceed such concentration, the sodium chlorite concentration preferably should not exceed 1500 ppm. It can, therefore, be seen that the composition of the fluid blended with the ground beef comprises a blend of liquid carbon dioxide at a pressure and temperature with a proportion of water and a quantity of sodium chlorite. Such conditions can provide carbonic acid having a pH of between 2.8 and 3.2. In this way, the specific gravity of the fluid can be increased, for example, from approximately 0.94 and up to, for example, 0.95 thereby enhancing the conditions under which rapid separation of ground meat will occur in the decanter style centrifuge as described herein simultaneously with the exposure of the ground beef to an anti-microbial environment capable of reducing the population of pathogens that may be present by 2, 3, or more logs. However it may also be desirable to remove at least a substantial part of the residual sodium chlorite and/or resultant sodium chloride post reaction between the carbonic acid and sodium chlorite. The amount of salts that are retained after treatment can be reduced by transferring a quantity at a controlled pressure and temperature of liquid carbon dioxide through conduit connecting with aperture 13621 and in the direction shown by arrow 13640 or alternatively via aperture 13655 in the direction shown by arrow 13646 at controlled flow and into space, for example, between members 13618 and 13620 or 13662 and 13660. Sufficient liquid carbon dioxide, which most preferably will contain a proportion of water can be transferred in sufficient quantity such that the centrifugal force applied thereto during the operation of the centrifuge, such that the fluid carbon dioxide and water will be encouraged to transfer through spaces 13661 and 13614 in the opposite direction to the flow of the lean meat in the direction shown by arrow 13668. Sufficient liquid carbon dioxide and water can be transferred so as to dilute and transfer residual salts held in solution contained within fluid in contact with lean meat being transferred in the direction shown by arrow 13668 so as to dilute and/or remove a major proportion of the residual salts by continual washing under pressure of lean meat transferred through spaces shown as 13614 and 13661. Any combination of water and liquid carbon dioxide at selected pressure and temperature can be transferred in the direction shown by arrows 13640 and 13646 and ultimately through such ports as 13621 on the upstream side of disc 13616 or alternatively on the downstream side of disc 13616 through port 13611 in the direction shown by arrow 13609. It has been observed that acidified sodium chlorite can cause deleterious discoloration of ground meat, and it is hypothesized that such deleterious discoloration or browning of red lean meat is caused by extended exposure to the residual salts and acids used in the acidified sodium chlorite method of pathogen reduction. The present invention provides a means of not only obtaining the benefit of using the acidified sodium chlorite process of anti-microbial treatment but to also enable the substantial removal of residual acids and salts that would otherwise remain with the processed meat and through consumption. The cross section shown in FIG. 13 comprises an outer cover 13624 rigidly retained by brackets 13610 and 13628 with member 13630 clamped to outer cover 13624 and retaining bearing 13632 so as to enable the rotation of member 13636 driven by timing belt 13634. Bowl 13629 rigidly connecting to member 13627 and 13636 provides an enclosed and sealed conduit within which shaft 13602 and inner Archimedes screw 13603 and outer Archimedes screw 13604 comprising a single member that can be freely rotated at selected speeds within the outer conduit 13629, 13627 and 13636. A blend of ground meat and fluid is transferred in the direction shown by arrow 13600 and arrow 13669 through ports such as 13672 and into space 13607 and 13667. The inner Archimedes screw 13603 is provided to enable transfer of fat in the opposite direction to arrow 13668 while lean meat after separation can be transferred in the direction shown by arrow 13668 and ultimately through gap 13614 and 13661. Dense gas of controlled temperature which may be as low as 60° F. and thereby reducing the specific gravity of the gas can be transferred through conduit 13642 into space 13607 and alternatively out and away from space 13607 as shown by arrow 13644.

Figure 14:
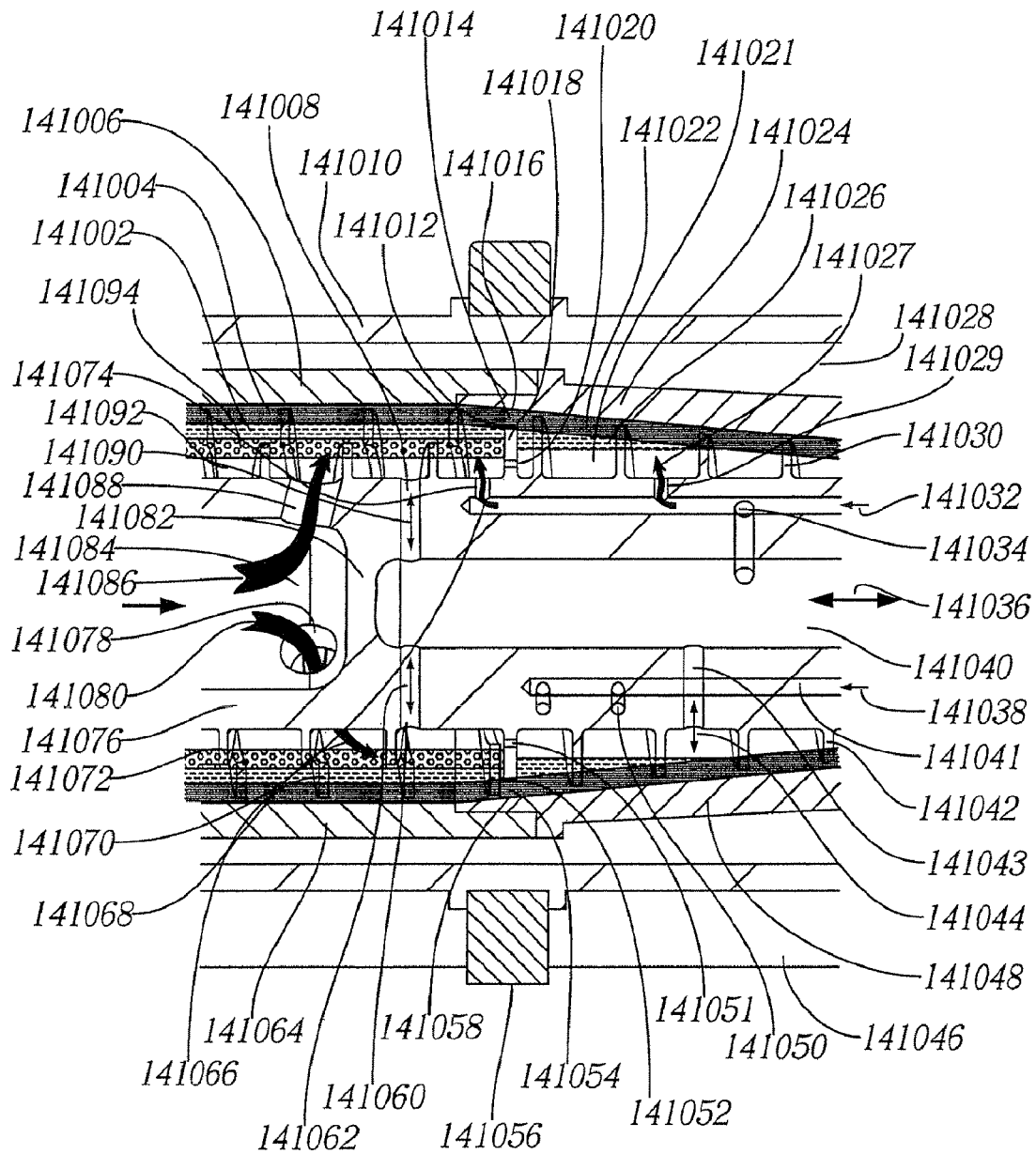
FIG. 14 is a diagrammatical illustration of apparatus in accordance with one embodiment of the present invention.

Referring to FIG. 14, an enlarged view of the segment in the vicinity of rigid disc 141018 which is equivalent to 13616 in FIG. 13, is shown. A clamp 141056 rigidly retains outer cover 141010 by attachment to base 141046 wherein housing 141010 encloses space 141028 and bowl 141006 connected directly to tapering member 141048. Centrally disposed shaft 141076 is mounted within bowl 141006 such that the outer edges of Archimedes screw shown with members 141004, 141066, 141042 and 141030 are in close proximity to the inner surface of members 141064 and 141048. A gun drilled conduit 141084 enables controlled transfer of any selected blend of ground beef in the direction shown by arrows toward apertures 141088 and 141078 and there through as shown by arrows 141086 and 141080. Upon transfer there through and into space enclosed by bowl 141006, stratification occurs in a manner shown by outermost layer 141004 in contact with the inner surface of member 141006 representing the layer in which the most dense component of ground beef, i.e., lean meat, will stratify. The innermost region 141092 is occupied by the lightest or least dense material which in this case is gas phase carbon dioxide. A layer of fat 141094 stratifies at a layer between gas 141092 and fluid 141002. It is evident that lean meat having density of approximately 66 lbs/cu. ft. being a component of ground meat wherein the fat component of the ground meat has a density of approximately 55 lbs/cu. ft. However, the liquid phase carbon dioxide pressurized so as to provide a fluid having a density of approximately 58 lbs/cu. ft. will stratify at layer 141002 between the outermost lean layer 141004 in contact with the inner surface of member 141006 and the lighter component of fat layer 141094 therefore stratifies as shown between the less dense gaseous layer 141092 and the more dense fluid carbon dioxide layer 141002. It can be clearly seen therefore that inner Archimedes screw represented by member such as 141072 is arranged so as to transfer a fat layer in the opposite direction to the direction in which outer Archimedes screw represented by members such as 141066 will transfer lean beef in layer 141004 in the opposite direction toward tapering member 141024. Members 141006 and 141024 also shown as 141064 and 141048 are rigidly attached together and can be rotated at a controlled speed such as 700 rpm and the inner assembly comprising two concentric Archimedes screws arranged about a central shaft 141076 can be rotated at a controlled speed such as 790 rpm. The differential between the speed of the outer rotating member at 700 rpm and the inner rotating member at 790 rpm is therefore 90 rpm. The ratio between the inner assembly comprising shaft 141076 and outer member comprising 141006 can be increased and decreased according to needs. Both components can rotate so as to enable the clean separation in stratified layers as described above without applying too much load. A substantially circular disc 141018 is rigidly fixed to central shaft member 141076 so as to provide space 141054 shown between outer rim 141052 and location 141058 of member 141048 and space 141014 shown between outer rim 141012 of member 141018 and location 141016 of member 141024. The gap shown as 141014 and 141054 can be adjusted by interchanging discs 141018. However, once an optimized disc has been identified it should be unnecessary to adjust for like materials processed within the centrifuge segment. As has been described above, it may be desirable to increase the density of the fluid shown in layer 141002 so as to enhance the separation of fatty material stratified in layer 141094, and this can be achieved by adding a solution of water alone having a specific gravity of one (1) or, alternatively, a salt solution such as sodium chlorite and water or any other salt. However, with sodium chlorite, the additional benefit of providing an anti-microbial treatment known as acidified sodium chlorite can be provided in such an instance. With the transfer of lean meat through gap 141014 and 141054, a quantity of acidified sodium chlorite can be carried therewith. It is undesirable to allow this and certainly more preferable to eliminate a major portion of the residual salts retained after such treatment and therefore by providing controlled quantities of fresh liquid carbon dioxide and/or water in the direction shown by arrow 141032 and 141038 and into space such as 141021 through port 141029 in the direction shown by arrow 141027. The concentration of residual spent salts can be at least diluted and even largely eliminated by allowing a quantity of such fresh fluid to accumulate in space 141026. Furthermore, holes such as 141051 and 141020 can be provided in circular disc 141018 to allow excess liquid carbon dioxide and/or water to pass there through thereby diluting the fluid in the region closest to the disc 141018. Temperature and pressure controlled gas can also be transferred through conduit 141040 into space such as 141092 through ports such as 141008 and 141060, also diluting the amount of residual salts in the region having close proximity to the ports 141074 and 141060. Gas can also enhance and facilitate the improved transfer of fat in the direction away from disc 141018 by rotating inner Archimedes screw shown by member such as 141072.

It should be noted that pure or substantially pure clean temperature controlled water may be used as the sole fluid in the separation of lean meat from fat comprising ground meat. This can be achieved by blending a suitable quantity of water with ground beef transferred through conduit 1084 in apparatus similar to that described in association with FIG. 14 or alternatively any other suitable centrifuge such as the decanter style centrifuge apparatus. When used in this manner, the layers shown as 141004, 141002, 141094, and 141092 may comprise an outer lean meat layer occupying stratified layer 141004 with a stratified layer of water at 141002 with fat adipose fatty tissue stratified at layer 141094 and with a gas selected for its suitability at 141092 including air. In this case, however, it is preferable to minimize the exposure of ground meat to a minimum quantity of water and to ensure that the process is performed such that the separation occurs in a short period of time such as not more than a few minutes, for example, 3-5 minutes should not be exceeded. Any residual water that may be transferred with lean meat through space 141014 and 141054 be minimized and this can be achieved by providing sufficiently ample quantities of liquid carbon dioxide in space such as 141021 and 141026 after transfer through ports such as 141050 and 141027 and 141074 in the direction shown by arrow 141070. When water is to be used as the primary separation fluid, a proportion of approximately 50% water and 50% ground meat can be used, however, this ratio can be adjusted as required and under certain conditions it may be preferable to reduce the quantity of water when compared to the quantity of ground meat such as a ratio of one part water to two parts ground meat, but it is preferable that there is no water gained during the process. This can be achieved by the provision of liquid carbon dioxide into space 141021. Any other suitable fluids can be used as alternatives such as blood, solution of sodium chloride, or any other salt, but in all instances, it is preferable that the fluid medium used shall be separated or at least minimized after separation. A benefit of using liquid carbon dioxide as a fluid to displace an undesirable fluid transferred with lean meat through spaces 141014 and 141054 is the capacity of anhydrous liquid carbon dioxide to extract water from the water laden lean meat after exposure to atmospheric pressure at which time the anhydrous liquid carbon dioxide will boil off to produce hydrated carbon dioxide gas thereby reducing the amount of water retained with the lean meat after separation. In a preferred embodiment, the amount of liquid carbon dioxide blended with lean meat beef after separation can be that quantity sufficient to ensure the removal of all added water during the evaporation process when exposed to atmospheric pressure. It is preferable that the removal of excess water from lean meat by this method be performed within an enclosed vessel maintained substantially at atmospheric pressure, however, with sufficient positive pressure to eliminate or at least minimize the egress of any atmospheric oxygen into the vessel and into contact with the lean meat.

Referring to FIG. 15, a cross section through shaft 13602 of FIG. 13 is shown. The outer circumference of shaft 13602 at the cross section "AA" shown in FIG. 13 is represented by circular profile 15772 in FIG. 15. Conduit 15774 is centrally disposed as shown in FIG. 13 through which gas can be transferred in or out in the direction shown by double headed arrow 13644. Radially drilled ports 15750, 15756 and 15762 as shown in FIG. 15 correspond with ports 13659 shown in FIG. 13 and gas can be transferred through the ports in the direction shown, for example, by arrow 13655 in FIG. 13. Drilled holes 15768, 15754, and 15760, shown in FIG. 15, correspond with conduit such as shown in FIG. 13 as 13611 with arrows such as 13609 and 13621 indicating the direction of flow of any liquid, such as liquid carbon dioxide and/or water which after transfer through conduit such as 13611, can be transferred through radially drilled ports shown as 15770, 15752, and 15758 in FIG. 15 in the direction shown by arrows 13621 and 13609 in FIG. 13.

Figure 16:
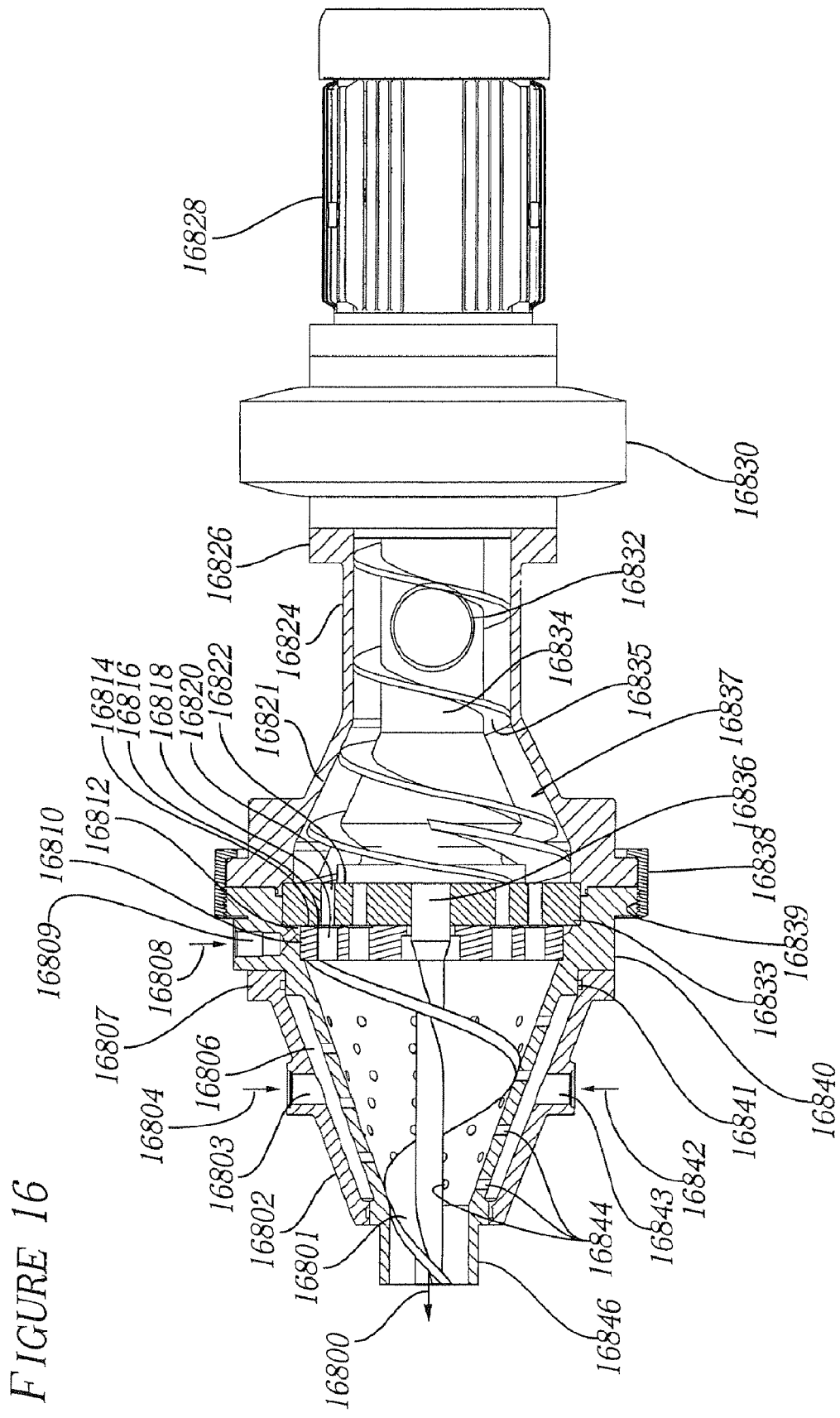
FIG. 16 is a diagrammatical illustration of apparatus in accordance with one embodiment of the present invention.

Referring to FIG. 16, a side elevation of an apparatus intended for the continuous grinding of any goods, such as boneless beef or any other meat, is shown with a section cross-sectioned to assist in thorough disclosure thereof. The apparatus is intended to provide a continuous blended stream of ground meat such as ground beef blended with liquids, such as liquid carbon dioxide and/or water, in controlled proportions selected to improve performance of the centrifuge or a separator as shown in FIG. 5. Conduit section 16846 shown in FIG. 16 would be arranged to connect directly to, with or without sealed bearings as may be required, to centrally disposed shaft 9011 with conduit 9064 there through as shown in FIG. 9 and as shown as 10200 in FIG. 10 with ground and blended goods being transferred directly from the apparatus shown in FIG. 16 to the apparatus shown in FIGS. 9 and 10. Said conduit 9011 in FIG. 9, 10200 in FIG. 10, corresponds with conduit 12383 shown in cross-sectional view in FIG. 12, 11350 in FIG. 11, corresponding with 11382 in FIG. 11 and conduit cross section 141084 as shown in FIG. 14. Arrow 16800 shown in FIG. 16 corresponds with arrow 13600 in FIG. 13, arrow 11349 in FIG. 11, and arrow 10119 in FIG. 10. The apparatus shown in FIG. 16 is constructed of suitable materials, such as stainless steel and plastic materials where appropriate, with rubberized gaskets where required to provide seals. Boneless beef transferred via a port shown as 16832 in FIG. 16 is transferred under pressure by Archimedes screw 16834 through grind plate 16833 such as through grind plate aperture 16820 into aperture 16818 in plate 16810 and after blending with fluids, transferred into mixing chamber within which Archimedes screw 16801 is mounted and then via conduit 16846 in the direction shown as arrow 16800 into the centrifuge equipment as described in connection with FIGS. 9 through 15 or to separator 120, as shown in FIG. 5.

Variable speed electric motor 16828 is connected directly to a gear reducer 16830 of selected ratio which in turn is connected to Archimedes screw member 16834. Variable speed electric motor 16828 can be adjusted by varying the electric current supplied thereto so as to vary the speed at which screw 16834 rotates thereby enabling a variable control of the mass flow of goods being transferred under pressure through port 16832 then driven by screw 16834 through grind plate 16833. The rotational speed of screw 16832 can be varied so as to adjust the mass flow of boneless beef through the grinding mechanism comprising a knife rotating with the screw against the surface of grind plate 16833 facing toward the screw and by varying the speed at which screw 16834 rotates, the knives attached thereto facilitating the cutting of meat transferred through apertures such as 16820 according to rotational speed. Boneless meat pumped through aperture 16832 and driven by screw 16834 is transferred through apertures in grind plate 16833 such as aperture 16820 at a mass flow rate controlled by the speed of variable speed electric motor 16828. Therefore, the increased rate of mass flow of beef through the grind plate is directly determined by the speed at which variable speed electric motor 16828 is driven. By increasing the rotational speed of screw 16834, boneless meat transferred through the grind plate increases correspondingly. Planetary gear reducer 16830 is attached to housing 16824 at flange 16826. An internally threaded nut 16838 matches with external thread at 16839 of member 16840 such that when nut 16838 is tightened, segment 16854 of housing 16824 is compressed against corresponding face of member 16840 adjacent to threaded section 16839. Grinding plate 16833 is clamped between member 16840 and housing 16824 so as to hold in place with a suitable compression. Grinding holes such as 16820 in grind plate 16833 are arranged to correspond with and locate centrally with an equal number of holes such as 16818 drilled in matching plate 16810 which is clamped in place by a shoulder machined in member 16840 which compresses and holds plate 16810 firmly against corresponding face of grind plate 16833. Apertures 16818 are drilled with larger diameter than the diameter of grinding holes such as 16820 in grind plate 16833. The purpose of this is to allow the free transfer of ground meat from grind apertures, such as 16820 and through adjacent apertures, such as 16818 in such a manner that there is no restriction inhibiting the transfer of ground meat through second plate 16810. Grind plate 16833 can be considered as a first plate and plate 16810 a second plate with grind holes such as 16820 corresponding with clearance holes in the second plate 16818. A series of recesses, such as 16814 and 16816, are machined in the face of second plate 16810 between the first plate and the second plate so as to provide a communication channel between holes drilled in the first and second plates. The recesses 16814 and 16816 are connected via annular passageway 16812 which is machined around the internal periphery of member 16840 at the location between the first and second plate. Annular aperture 16812 is in direct communication through a series of drilled ports and conduits with port 16809 and all such recesses and ports machined in connection with clearance holes such as 16818, end plate 16810 are in direct communication so as to allow any fluid such as liquid carbon dioxide transferred into port 16809 in the direction shown by arrow 16808 to emerge around the periphery of said holes such as 16818 in plate 16810 between plate 16810 and first grind plate 16833. In this way, pressurized liquid carbon dioxide transferred in the direction shown by arrow 16808 through port 16809 will emerge into holes such as 16818 in plate 16810 so as to cover the full circumferential surfaces of all cylindrical profile ground meat transferred through the holes such as 16818 in plate 16810. In this way, ground meat processed by transfer through holes such as 16820 in plate 16833 is fully immersed in fresh liquid carbon dioxide transferred under pressure through the holes such as 16818 in plate 16810 when ground meat is transferred directly into adjacent holes such as 16818 in second plate 16810 from grind plate 16833, grinding holes 16820. Particulates of ground meat are transferred at a mass flow rate determined by the pressure of goods transferred through aperture 16832 and also the rotational speed of the screw 16834 driven by variable speed motor 16828. Furthermore, the particle size is also determined by the rotational speed of screw 16834 in combination with the mass flow rate pressurized and transferred through inlet port 16832. Port 16832 is connected directly with a high pressure positive displacement pump and the knives attached to screw 16834 in contact with face 16822 of grind plate 16833. By increasing the rotational speed of screw 16834 and reducing the mass flow of boneless beef through port 16832, the cut size of meat particulates can be reduced. Alternatively by increasing the mass flow of boneless beef through port 16832 and reducing the rotational speed of screw 16834, the particle size of ground meat can be increased. The particle size of ground meat will affect the effectiveness of fat separated from lean in the centrifuge or inclined separator. By reducing the particle size, the proportion of fat separated from lean can be increased. Conversely, by increasing the size of the ground meat particulates, the ratio of ground meat separated from lean meat shall be altered such that less fat will separate from lean meat. Therefore, by adjusting the particle size, a specified grade of ground beef having a selected fat content can be produced. In this way, any selected fat content ground beef can be produced by varying the mass flow of boneless beef through aperture 16832 in combination with the rotational speed of variable speed electric motor 16828. Reclaimed fluid from the centrifuge separated by extraction through ports shown as 11374 in FIG. 11 and subsequently through manifold 11422 can be recycled by control of mass flow through ports 16803 and 16843 in the direction shown by arrows 16804 and 16842. An outer member 16802 is fitted around member 16840 to provide annular cone shaped manifold space 16806. Said space 16806 is in direct communication with a series of holes such as 16844 drilled in member 16840. It can therefore be seen that with the apparatus herein disclosed and described in association with FIG. 16, ground beef can be blended continuously and according to a selected proportion with fluids transferred via ports 16803 in the direction shown by arrow 16804, port 16809 in the direction shown by arrow 16808 and into port 16803 in the direction shown by arrow 16842. Screw 16801 provided with a pitch approximately twice the pitch of screw 16834 is provided to ensure that consistent mass flow of blended ground meat and specified fluids transferred, ultimately through conduit 16846 in the direction shown by arrow 16800, are consistently blended on a continuous basis.

Figure 17:
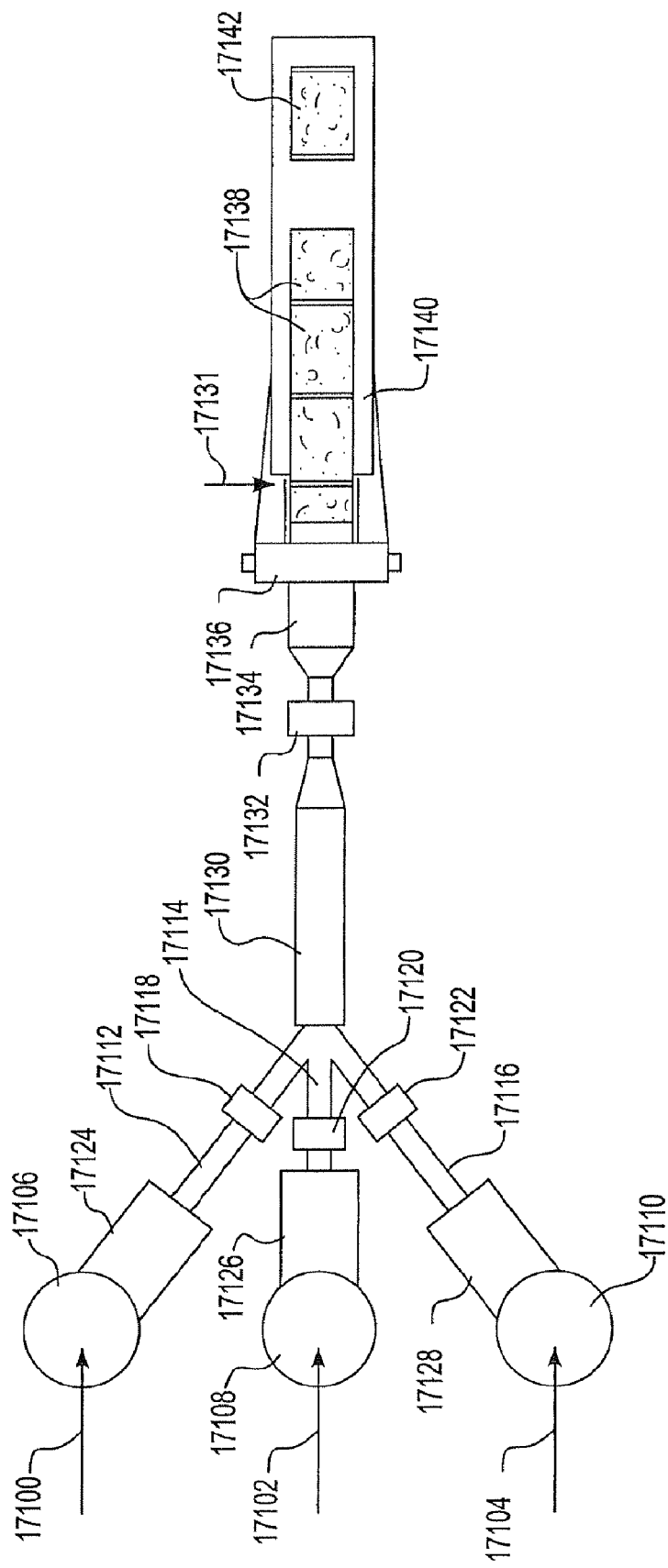
FIG. 17 is a diagrammatical illustration of apparatus in accordance with one embodiment of the present invention.

Referring to FIG. 17, an apparatus for packaging lean meat or fat used in process blocks 132 or 146 is illustrated. One embodiment of the invention shows three streams of boneless meat 17100, 17102, and 17104 being transferred into vessels 17106, 17108, and 17110, respectively. Each stream 17100, 17102, and 17104 may represent a different stream produced via inclined separator 120 of different lean meat content. Three streams of boneless meat are provided in conduits 17112, 17114, and 17116, with fat measuring devices 17118, 17120, and 17122 provided thereon. Fat measuring devices are described herein. The velocity of each stream of boneless meat, is varied according to fat content provided by the fat measuring devices 17118, 17120, and 17122. The signal generated by fat measuring devices 17118, 17120, and 17122 are sent to a central processing unit (CPU) which may process the information and send a control signal to one a plurality of variable speed pumps 17124, 17126 and 17128 to control the desired flow rate of streams in conduits 17112, 17114, and 17116. The streams 17100, 17102, and 17104 are transferred into a single conduit 17130 with screw pumping means therein. A fourth measuring device 17132 is provided to measure the single stream of boneless meat. The combined streams 17100, 17102, and 17104 of boneless meat are extruded via a die 17134, as a single stream at 17134 having a rectangular cross-sectional profile. The single stream is transferred directly into a gas barrier plastic tube of material such as a multi-layer heat sealable flexible web, which is fabricated from roll 17136 of a continuous web of such packaging material. The extruded section of boneless meat, is transversely cut by knife at 17131, into portions 17138, of approximately 30-60 pounds each.

The streams of meat 17100, 17102, and 17104 can be provided in a substantially enclosed conduit with a gas provided therein. Similarly, any processing equipment, such as vessels 17106, 17108, and 17110, pumps 17124, 17126, and 17128, measuring devices 17118, 17120, 17122, and 17132, blender 17130, die 17134, packaging 17134, and tube 17136 and any adjoining conduit is substantially kept in a gas environment, such as carbon dioxide, so the meat is continually exposed to the gas, and the exposure of the meat to oxygen is minimized. Plastic tube 17140 is then sealed and severed, enclosing each 60-pound portion of meat 17142. Carbon dioxide gas retained within the sealed package, will then dissolve forming a pack that resembles a vacuum pack. Each 60-pound portion may then be packaged in a carton and transferred into storage in readiness for shipping. In one aspect, the fat content can be provided on an RFID tag that is attached to a package containing the 60-pound portion. However, it is possible that portions can be stored individually in cartons, where each carton includes a unique identifying mark, such as a 2-D bar code and the collection of cartons mounted on a single pallet can include the RFID tag with the information relating to each of the individual cartons being contained therein. Because the unique identifying marks can be recorded along with the weight of the portion and any other information, the RFID tag can include the whole of the information relating to any and all cartons on a single pallet.

In another aspect, the apparatus depicted in FIG. 17 can be implemented with a single stream of meat. Thus, for example, equipment designated as 17106, 17124, 17112, 17118, 17110, 17128, 17116, and 17122 can be eliminated. It is to be appreciated that although this equipment may go unused, it may still be physically present, in the case where it is desired to be used. The operation of the equipment therefore proceeds with a single stream of meat 17102, for example. This may be advantageous under certain conditions. For example, it may be advantageous if the amount of fat or the variable that is sought to be controlled is not of particular concern. Measuring and recording the actual fat content, however, can be performed, if so desired. In another example, the meat being provided as a single stream has a substantially unvarying fat content and, therefore, the need for adjusting the fat content is unnecessary.

In a further aspect, two or more streams of boneless meat (meat with carbon dioxide gas substantially filling any voids therein) are pumped and measured for fat content by an x-ray device in each stream, and the velocity and quantity (for example, mass flow) of each stream is then adjusted according to the fat content by the variable speed pump. The mass flow can be adjusted based on variables besides fat content, such as water or protein, lean, contained in the meat. The two or more streams are combined, under conditions which do not include grinding, into a single stream. In this manner, the combined stream may be transferred directly into an enclosed vessel, substantially filled with carbon dioxide, or any other gas composition, wherein a sanitizing agent can be applied, with a measured quantity of water. Following this sanitizing step, the combined stream can be either coarse ground or left as is, and then, in a single stream transferred via a profiled conduit and transferred to a further x-ray (or equivalent device) to measure the fat content (or water or protein) and the stream can be divided. The profiled extruded stream can be cut into sections of boneless meat, for example, weighing about 60 pounds, which are then packaged into any package wherein each package has an RFID tag (or other identifying means such as a barcode) attached which contains information including the measured fat and lean content of the meat.

In a further aspect, the sections of meat may be frozen or chilled and transferred to another location where the blocks are further arranged and/or processed into streams of meat according to the fat content (or water or protein), which is known by reading the information contained in the RFID tag. The streams are then pumped and measured by x-ray means (or equivalent) and combined in any desired manner to arrive at a desired fat content.

In yet another aspect, the apparatus can be joined to a rotating carousel packaging apparatus as described below. In this manner, a continuous packaging system is provided for the production of packages that are substantially kept from being exposed to oxygen.

Figure 18:
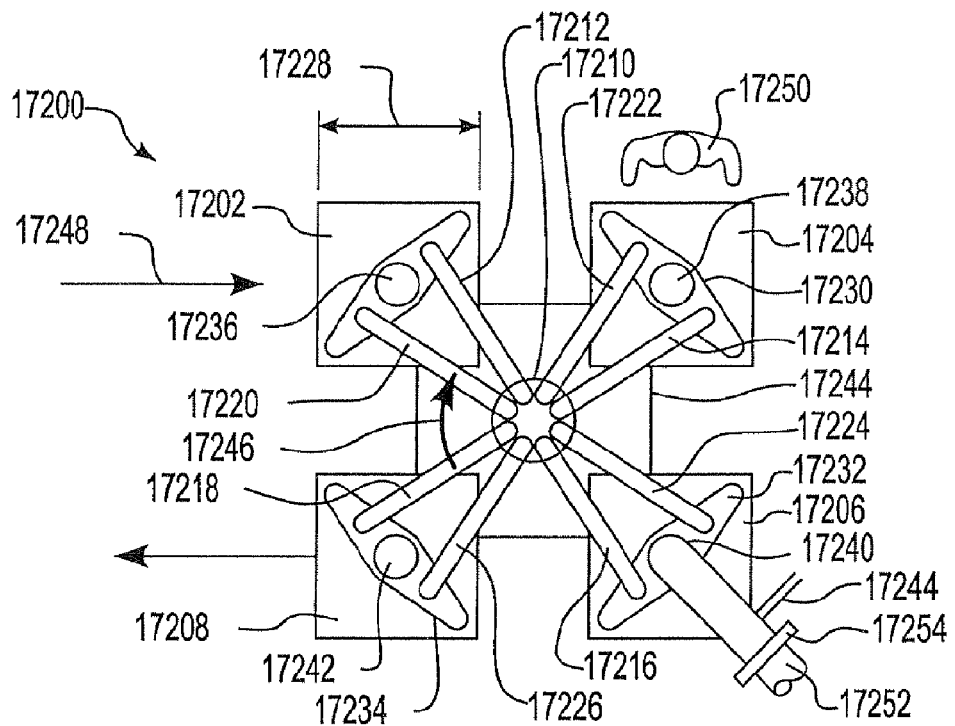
FIG. 18 is a diagrammatical illustration of apparatus in accordance with one embodiment of the present invention.

Referring to FIG. 18, a packaging apparatus is illustrated for use as a packaging device in process blocks 132 and 146 of FIG. 2. In this aspect, a rotating carousel 17200 is provided. The rotating carousel 17200 includes a plurality of loading assemblies, designated as 17202, 17204, 17206, and 17208, wherein the number of loading assemblies dictates the number of operational stations, wherein a certain loading operation is carried out at each of the operational stations. It should be readily appreciated that any number of loading assemblies can be used, the number shown being merely illustrative of one embodiment. Referring to FIG. 18, the carousel 17200 includes a centrally disposed header 17210. Header 17210, in turn, is connected to a series of first 17212, 17214, 17216, and 17218 and second 17220, 17222, 17224, and 17226 headers, which are in turn connected to loading assembly loading connectors 17228, 17230, 17232, and 17234. Loading connectors 17228, 17230, 17232, and 17234 are provided with loading apertures 17236, 17238, 17240, and 17242 disposed at a central location, which is interposed between each set of the first and the second headers. Loading assemblies 17202, 17204, 17206, and 17208 are connected to a central frame 17244. Central frame 17244 supports the central header 17210, which together with the loading assemblies, rotates as an assembly in the direction of the arrow designated as 17246.

Figure 19:
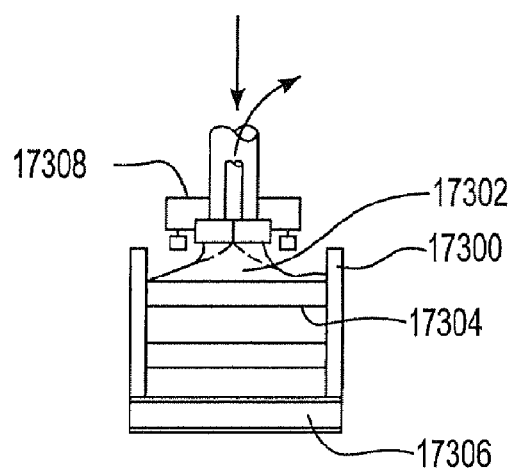
FIG. 19 is a diagrammatical illustration of apparatus in accordance with one embodiment of the present invention.

Referring to FIG. 19, a single loading assembly is shown. Each loading assembly includes a frame 17300, sized to hold any container, such as a pouch 17302. The frame 17300 is connected to a rotating carousel 17200 (FIG. 18). Frame 17300 is constructed from four walls of similar dimensions so as to form a box-like container. Frame 17300 is constructed from four posts which form the corners of the box. Slats 17304 are then connected to two of the four corner posts for rigidity. A holder for a pallet 17302 can be constructed within the frame 17300, so that the entire frame 17300 and pallet 17306, together rotate as one assembly. Pallet 17306 can hold the weight of a fully loaded pouch 17302. Frame 17300 can have a gate, so as to open, thus allowing pallet 17306 and pouch 17302 therein to be removed as a unit. In addition, pallet may be molded with features or otherwise provided with features that allow the stacking of one pallet with pouch atop another. In one embodiment, the container is a pouch which can be provided by the Scholle Corporation. The pouch may include barrier materials which substantially prevent the transfer of gases. Referring still to FIG. 19, the loading assembly includes the loading connector 17308, described in detail below.

Figure 20:
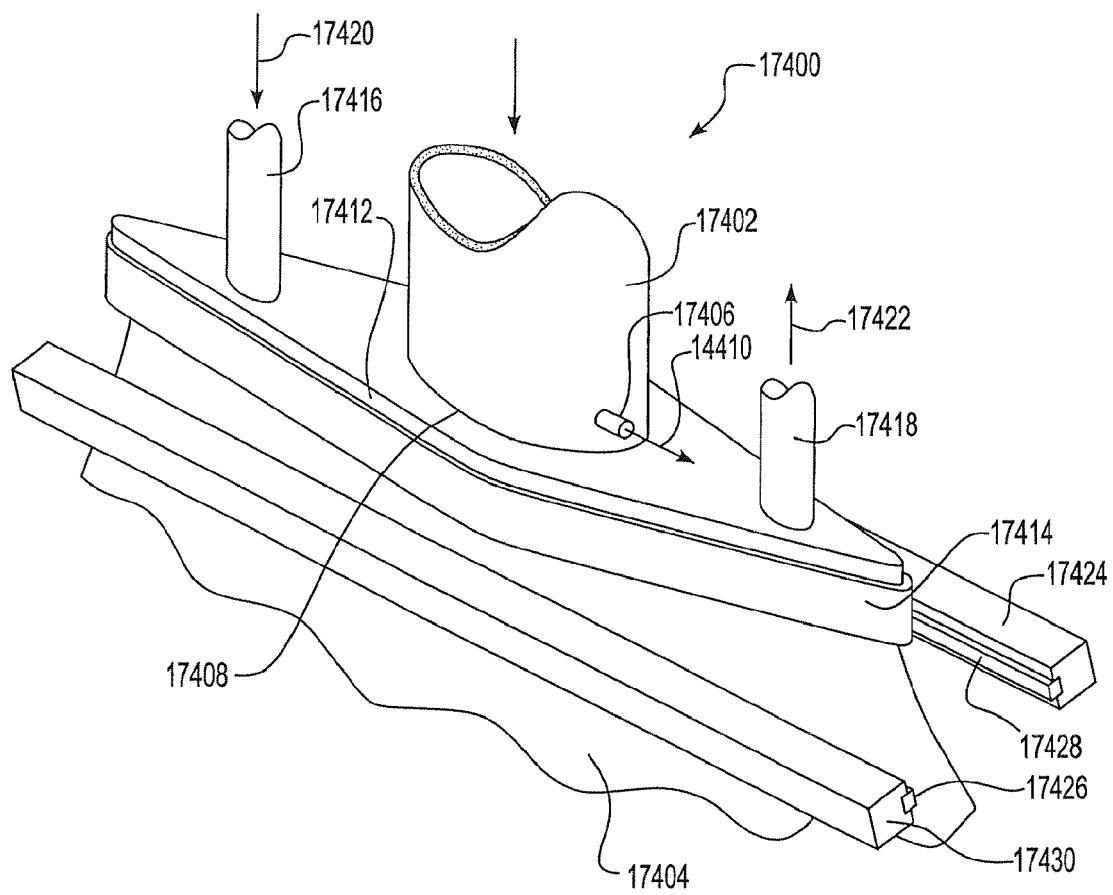
FIG. 20 is a diagrammatical illustration of apparatus in accordance with one embodiment of the present invention.

Referring to FIG. 20, one embodiment of a loading connector 17400 is illustrated. A loading connector, such as connector 17400, is used to attach a fill spout 17402 to the opening of any suitable container, such as a pouch 17404. Fill spout 17402 can be any conduit which provides a load of processed beef according to the invention. As an example, fill spout 17402 can be connected to the die 17134 in FIG. 17. However, any other supply of meat or meat product can be directed to the fill spout 17402 of FIG. 20. The fill spout 17402 includes a purge conduit 17406. Purge conduit 17406 can be used to expel or purge any undesirable gas from within the interior of conduit 17402 in the manner described below.

A loading connector 17400 includes a fill aperture 17408, which is shown as being attached to the fill spout 17402. Means for attaching the fill spout to the fill aperture can include, but is not limited to any fastener, such as a snap-on connector fitted with a seal to prevent the escape of gasses in between the interior edge of the fill aperture and the exterior diameter of the fill spout. Such a snap connector can be fitted with a groove in either the connector upper member 17410 or the fill spout 17402 and a ring located in either in the interior of the fill aperture 17408 or on the fill spout 17410. A valve can be provided on the end of the fill spout 17410 or as an integral part of a fitting hermetically sealed to the pouch. Upper member 17410 perimeter is surrounded by downwardly extending walls 17412 about the periphery of member 17410. Exterior surfaces of walls 17412 may be provided with a lip to more securely attach the opening of pouch 17404. In one embodiment, a collar 17414 is provided that can securely clamp the pouch 17404 to the exterior surfaces of the walls 17412, and thus to the loading connector 17400.

The upper side of member 17410 includes a first 17416 and a second 17418 header connected in a manner so as to provide for communication from either the first or the second header, 17416 and 17418, respectively, into the interior of the pouch 17404. In one aspect, header 17416 can be used to provide any desirable gas in the direction as indicated by arrow 17420, and header 17418 can be use to evacuate any gas from pouch 17404 therefrom in the direction of arrow 17422. In this way, gas can be injected into pouch via 17416 and evacuated via 17408 and thereby ensuring that the pouch is inflated prior to filling while flushing any undesirable gasses from the pouch. A desired gas pressure can also be maintained within the pouch during the loading process, and if so desired a source of vacuum can be connected to the filled pouch so as to evacuate the pouch to a selected vacuum level that removes some or all gas from within the pouch.

The connector assembly 17400 includes a first 17424, and second 17426 clamping bar. Clamping bars 17424 and 17426 are positioned oppositely of connector assembly 17400. In this manner, once pouch 17404 has been attached to connector assembly 17400, clamping bars 17426 and 17424 can be actuated to approach pouch 17404 on opposite sides thereof. The length of clamping bars can be adjusted depending on the width of the mouth opening of the pouch 17404. In this manner, a seal can be produced that extends the width of the pouch opening. Clamping bars 17424 and 17426 can be mounted to a pneumatically or hydraulically actuated arm to move toward each other. Clamping bars 17424 and 17426 include a heating element 17428 and 17430, respectively. Heating elements 17428 and 17430 are placed on a side of clamping bars 17424 and 17426, such that heating elements 17430 and 17428 will be in touching proximity with the pouch 17404, when clamps are actuated to clamp about the pouch opening. In this manner, pouch 17404 can be hermetically heat sealed by providing any heat sealable material as part of the interior of the pouch 17404.

Referring to FIG. 18, one embodiment of the packaging carousel 17200 is described. Generally, the number of stations will correspond to the number of loading assemblies. In the presently described apparatus, packaging carousel 17200 is designed to include four stations. At a first station, generally denoted by reference numeral 17202, an empty frame, also referenced by number 17202, sits idle, ready to accept a pallet being loaded from the direction of arrow 17248. In this station, frame 17202 is empty and does not contain a pouch. Carousel 17200 rotates to a second station, generally denoted by reference numeral 17204. In station 17204, an operator 17250 can place a pouch of any size within frame and attach the connector assembly 17230 to the pouch opening. While the operation of loading pouches is described as a manual operation, it is foreseeable that this operation can be automated so as to eliminate any human activity. As can be seen in FIG. 18, and as more thoroughly discussed above, a connector assembly 17232 is connected via headers 17224 and 17216 to a central header 17210. Headers 17224 and 17216, as well as header 17210 can include valves positioned at any location to accomplish purging and evacuation of the pouch. However, in other embodiments, the purge header of each loading assembly can be attached to a separate header while the evacuate headers can be attached to an evacuate header. While reference is made to single central header which can be both a purge and an evacuate header, it should be readily apparent that other configurations, including multiple headers and valves can likewise be used. At the second station 17204, the purge operation proceeds in the following manner. While some steps may be indicated as occurring before certain other steps, it is to be appreciated that the steps may proceed in any manner to functionally accomplish purging any spaces in the fill spout 17252 and pouch with any gas. A valve on purge header 17214 can be closed and a valve on evacuation header 17210 can be opened to introduce a gas into the pouch. Once a pressure is reached, the valve on purge header 17222 is closed and the valve on evacuate header 17214 is opened. In one embodiment, the central header 17210 may now be connected to a vacuum source to draw the purge gas from within the pouch and into the central header 17210. Once a vacuum is established or gas pressure is reached, the valve on evacuate header can be closed. This sequence may be repeated for any number of cycles until it is deemed that the pouch has been evacuated of substantially all oxygen. However, in another aspect, valve on purge header 17222 can be opened and valve on evacuate conduit 17214 can be opened simultaneously. In this manner, a continuous stream of gas flushes the interior of the pouch. Flushing takes place for a time period sufficient to reduce the level of oxygen within the interior of pouch to an acceptable level. Once it is determined that pouch contains substantially little to no oxygen, valve on conduit 17222 and valve on conduit 17214 are closed. Valve on conduit 17222 is then opened to expand pouch to substantially fill the interior volume of the frame. In this manner, pouch is made ready to accept meat therein.

Once operator 17250 has completed the pouch purging operation, the loading assembly is ready to move to a third station generally denoted by numeral 17206. At station

17206, a fill spout 17252 is connected to loading assembly 17232. Fill spout 17252, as well as any headers can include any number of valves to accomplish purging and evacuation of any dead spaces with the fill spout 17252, such as could occur when loading is stopped.

In one embodiment, fill spout 17252 is provided with two valves. First valve 17254 is located a distance from the connector 17232. Second valve (not shown) is provided at the loading connector 17232. Initially both the first and the second valves on fill spout 17252 are closed. One or more purge valves 17244 are provided on the fill spout 17252. In this manner, any dead spaces between the first and the second valves can be purged of undesirable gases, such as oxygen, and replaced with any suitable gas. Once dead spaces have been purged and flushed with a desirable gas in fill spout 17252, valve 17254 can be opened to allow the introduction of processed beef into the pre-inflated pouch.

In one aspect, frame 17206 can be mounted on load cells to continuously measure the amount of meat loaded within pouch, and valve 17254 can be automated to close when a specific quantity is reached. Furthermore, any of the gas purging and evacuating operations may be carried out automatically with the aid of pneumatically actuated valves. In this manner, continuous loading and packaging of processed beef into pouches can be realized.

In one aspect, the weight can be recorded on any device, such as an RFID tag, wherein the RFID tag can be attached at any location on the pouch. When the pouch has reached its predetermined load weight, the pouch can be sealed by the clamping bars 17424 and 17426 (shown in FIG. 20), followed by hermetic sealing of the pouch 17404 with heat seal bars 17430 and 17428. When the sealing is completed, carousel 17200 is readied for the fourth station.

Referring to FIG. 18, at fourth station 17208, connector 17234 can be unclamped from pouch opening. Pouch sits on pallet, and therefore pallet with pouch can be carted away while frame remains with the carousel assembly, ready to begin the cycle anew. Loading assembly now moves to station 17202, ready to receive a pallet. In this manner, a filled pouch and pallet can be carried away simultaneously.

Pouches with a capacity of 500-1000 kg are provided in an oxygen-free environment. Pouches useful in the practice of the present invention include, but are not limited to any corner fin sealed box-like pouches having a square or rectangular cross section, such as those supplied by the Scholle Corporation. Pouches can include openings in both the upper and lower sides. In this manner, the upper opening is more suitably configured to be a loading opening and the lower opening is more apt to be a unloading opening. Openings can be about 5 to 8 inches. Pouch materials may include any number of barrier materials including, but not limited to, any heavy gauge foil composites, or other equally suitable barrier and non-barrier materials.

In another aspect, a single sealable or re-sealable opening can be attached directly to the pouch so as to allow the filling of the pouch with emulsified meat or combinations of meat and vegetable matter and/or soups for human or animal consumption. After loading the pouch, the sealable opening can be hermetically sealed and the pouch shipped to a customers location where the contents of the pouch can be pumped directly from the pouch via the sealable opening.

Figure 21:
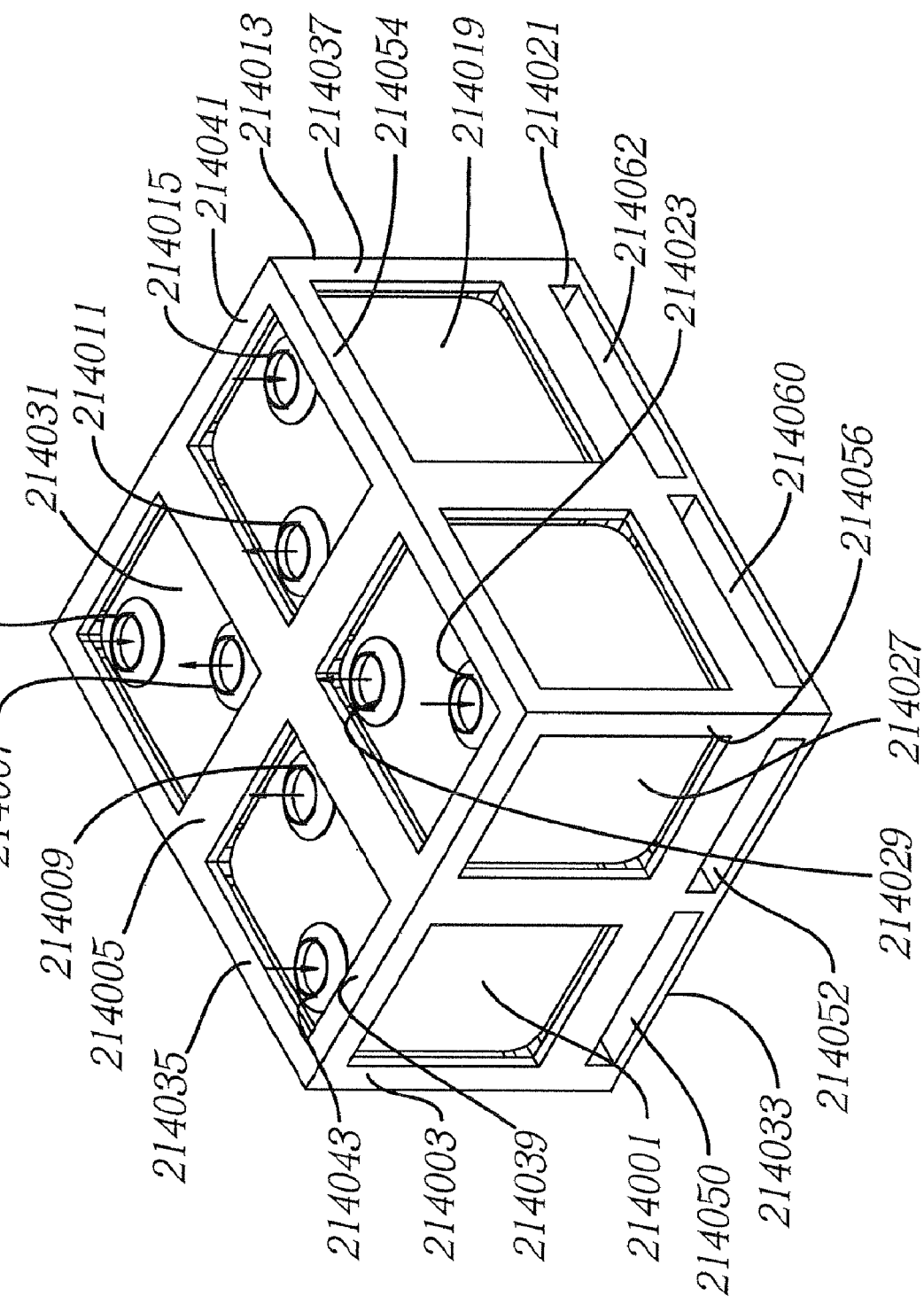
FIG. 21 is a diagrammatical illustration of apparatus in accordance with one embodiment of the present invention.

Referring to FIG. 21, another embodiment is shown wherein a group of 4 square or rectangular profiled, "fin" or "lap" sealed barrier pouches with substantially vertical sides when filled, such as 21001, 21027, 21019, are arranged in a specially constructed frame 21013 mounted to a base 21033, wherein the base and frame are preferably manufactured from any plastics materials, such as polypropylene or any recycled plastic, can be provided for any suitable purpose but with the primary purpose of enabling delivery of safely treated and sanitized boneless meat to a warehouse style supermarket such as Costco of Issaquah, Washington, or Sam's warehouse style supermarkets, a division of Walmart supermarkets of Bentonville, Ark.

Referring to FIG. 21, frame 21013 is rigidly fixed to base 21033 and profiled to enable stacking such that the lower, external surface of base 21033 mates with the upper surface 21035 of frame 21013 in such a way that individual frame assemblies can be stacked securely and loaded into transport vehicles such as shipping containers and road transport trailers having a load configuration comprising two pallets wide and four or five along the container length or more, but typically where a 20 foot refrigerated shipping container (FCL) can securely accommodate ten pallets per single layer. Base 21033 is arranged with horizontally disposed slots 21050, 21052, 21060, and 21062, that will allow the convenient location of typical fork lift tines in a typical manner, for stacking, loading, or unloading of the pallet frame(s). Any quantity of pouches, conveniently filled with goods, such as boneless meat or coarse ground beef (or any other meats or mixtures thereof which can include any ingredients such as spices, herbs and food additives) can be arranged in a corresponding pallet or other arrangement.

As shown in FIG. 21, a preferred embodiment is detailed, wherein 4 barrier pouches (wherein the term "barrier" refers to gas, liquid or vapor barrier), each having a capacity of approximately 400-600 lbs, is arranged symmetrically in a convenient, stackable pallet specially built for the application. The base of pallet 21033 is arranged to mate and preferably lock in location with appendages such as mating ridges, lugs, or any suitable protrusion that enables the efficient stacking of any and all pallets such as 21033 directly above or below each other, while also allowing for the destacking or unloading of the pallets from any refrigerated transport vehicle or racking in refrigerated storage built for the purpose such as this. Any container or storage room used for the shipping or storage of the subject pallets, with goods loaded into pouches and retained within the pallets generally as described above, should be temperature and/or climate controlled as required to ensure that the goods are maintained at any selected temperature such as between a range of 30° F. to 40° F.

Pallet frame 21013 can be constructed of a plastic (or metal) material wherein a base with plan view dimensions of approximately 40 inches by 48 inches corresponding with the standard US Grocery Association pallet dimensions and materials. Vertical corner sections such as 21003 and 21037 are located at each of the pallet four vertical corners. Horizontal members such as 21039, 21041, 21035, and 21054 are arranged to provide a horizontally displaced, rectangular structure with a "cruciform" 21005 configured and attached therein as shown and displaced between said rectangular, horizontally displaced members 21035, 21041, 21039, and 21054 with vertical corner sections 21037, 21056, 21003. The assembled vertical columns with horizontally displaced members provide a rigid frame mounted to base 21033 wherein the base can be arranged to be of a common size with a standard U.S. Grocery Association pallet but in this instance having four compartments arranged to securely retain filled, single use and disposable barrier pouches 21001, 21027, 21019, and 21031. The palletized frame as described with four pouch compartments comprises a preferred configuration, however a palletized frame with similar overall dimensions can be arranged with any suitable number of compartments provided to conveniently retain a corresponding quantity of pouches such as, more than four or less than four. Pouch filling ports 21059, 21015, 21023, and 21043 are arranged generally at an outer corner of frame 21013. Arrows are shown adjacent to each of the corner pouch filling ports 21059, 21015, 21023, and 21043 which indicate the direction of a flow of goods, into the respective pouches, when said pouches are being filled with said goods (such as boneless beef). Extraction ports 21009, 21007, 21011, and 21029, are arranged to enable the extraction of the goods contained in each pouch and an arrow is shown adjacent to each extraction port showing the direction that goods may follow during extraction. Goods extraction from each pouch can be arranged in either a simultaneously process by extracting goods from all pouches at the same time or most preferably, from each pouch separately and individually, when goods can be extracted from a single pouch, (or if so desired, two at any one time), sequentially starting with, for example, extraction port 21009 followed by extraction of goods from pouch 21031 via port 21007, then via extraction port 21011 with goods from pouch 21019, followed by port 21029 and until all goods have been extracted from each pouch via the respective extraction port. In this way, the identification of goods contained in each pouch can be automatically obtained and read by accessing the information stored in an RFID tag, for example, such as from RFID tag 23201 shown below in association with FIG. 23. Any information relating to goods harvested from an identified animal source, having been associated with said goods loaded into a particular pouch at the point of loading, and wherein said information has been loaded into the respective RFID tag attached to the subject pouch, (by virtue of said RFID tag being attached to the referenced port being attached to the referenced pouch) can be read and transferred to any packaging into which the goods are subsequently loaded, in association with the goods extracted from the subject pouch. Additionally, extraction ports can be located, generally, at a central location wherein each extraction port is positioned at a corner of the cruciform 21005 as shown in FIG. 21.

Figure 22:
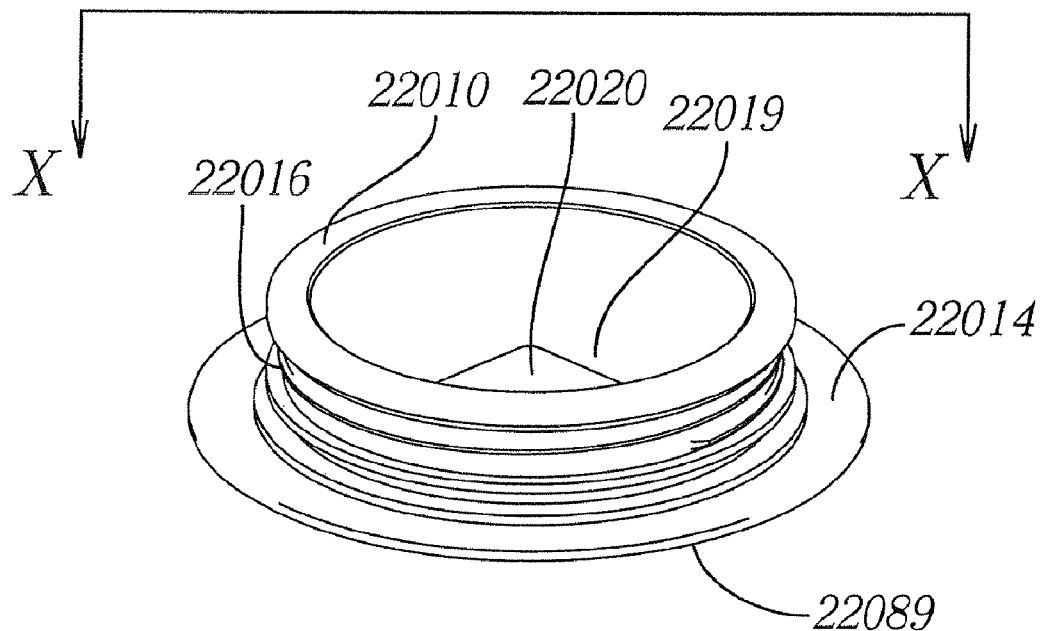
FIG. 22 is a diagrammatical illustration of apparatus in accordance with one embodiment of the present invention.
Figure 23:
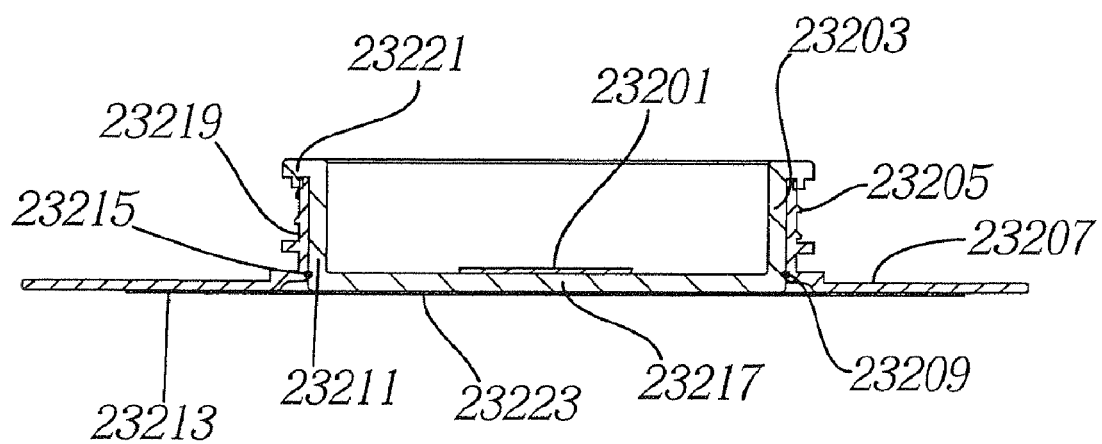
FIG. 23 is a diagrammatical illustration of apparatus in accordance with one embodiment of the present invention.

Referring to FIGS. 22 and 23, a 3-D view of a filling port 22089 can be seen. A cross-sectional view X-X of filling port 22019 is shown in FIG. 23. A flexible flange 22014 is arranged with a circular profile and attached to a threaded vertically disposed circular conduit 22016. Flexible flange 22014 is arranged to enable the hermetic sealing or welding to a barrier pouch such as shown as 21019 in FIG. 21. A mating plug 22010 is shown in position having been inserted into the vertically disposed conduit portion of the opening in fitment vertically disposed conduit 22016, and in such a manner that an interference fit is created by an aggressive contact between the two components 22089 and 22010. While there may be no adhesive or heat seal provided between plug 22010 and fitment 22089, the interference fit provided ensures that no air or any matter can escape through the port when plug 22010 is locked in place. Plug 22010 is provided with base 22019 to which an RFID tag 22020 can be securely attached. The RFID tag 22020 can be arranged to record and retain electronic data associated with the contents of any pouch to which fitment 22089 with plug 22010 is hermetically sealed.

Referring to FIG. 23 cross section X-X is shown. Plug 40211 is shown with RFID tag 40201 bonded to the internal face of plug base 23217 in such a manner so as to ensure suitable securing of RFID tag 23201 to plug 23211. Vertically disposed walls of port 23219 with threads 23205 are attached to flexible ring 23207. A barrier membrane 23213 can be hermetically sealed to flexible disc 23207 across fitment 23219 opening at 23223. Plug 23211 is arranged to have an aggressive interference fit when engaged in position with vertically disposed port walls 23219. Threads 23205 are provided in circular walls 23219 so as to provide a means of a goods filling attachment (not shown) to a conduit (also not shown) providing goods to fill any pouch to which the fitment has been hermetically sealed. The interference fit between member 23219 and plug 23203 is enhanced by ridge 23209 and 23215 on the internal peripheral annular surface of member 23219 and in such a way so as to engage with plug member 23221 when inserted with adequate force into internal bore of member 23219. RFID tag 23201 is bonded to plug base 23217. RFID tag 23201 is preferably located as shown, however, RFID tag may be located elsewhere but in any case is securely attached to the pouch.

Figure 24:
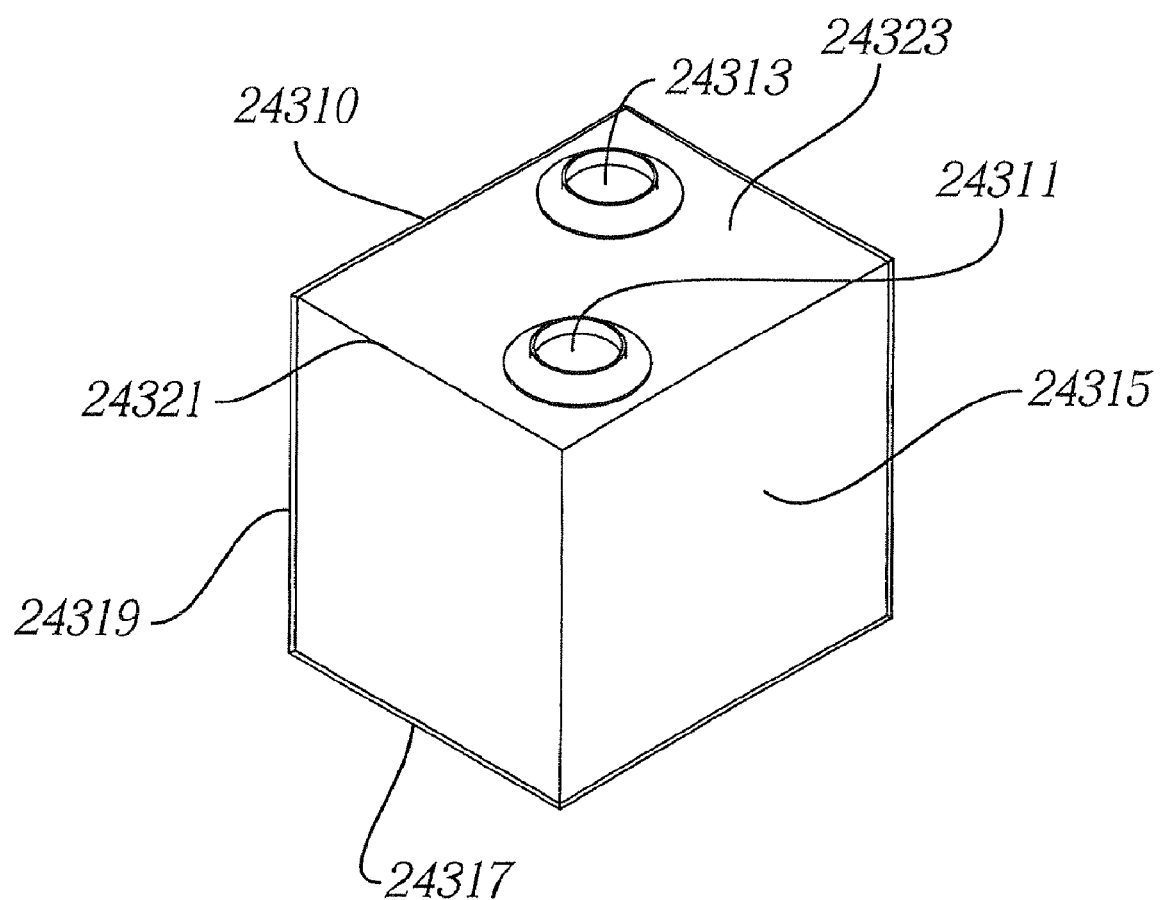
FIG. 24 is a diagrammatical illustration of apparatus in accordance with one embodiment of the present invention.

Referring to FIG. 24 a pouch 24315, manufactured from any multiple layer plastics material with a barrier layer providing a combined multiple layer web of flexible material, is shown with "fin" seals such as 24310, 24321, 24319, and 24317 along each (or some) corners of the generally cube or rectangular profiled pouch 24315. A filling port assembly 24313 and extraction port assembly 24311 are arranged in a hermetically sealed disposition to the upper face 24323 of pouch 24315 as shown in FIG. 24. Filling plug port assembly 24313 may be provided as generally disclosed in accordance with the description associated with FIGS. 22 and 23. Extraction port 24311 is arranged generally in accordance with the disclosure associated with FIG. 25 herein below. Pouch 24315 can be filled via filling port 24313 with, for example, coarse ground meat. Goods such as coarse ground meat loaded into pouches may be extracted with a vacuum source applied via a suitable conduit attached preferably by a temporary attachment by screwing onto threads such as shown as 25419 shown in association with FIG. 25. In this way, coarse ground meat or other goods located in pouch 24315 of FIG. 24 can be extracted by vacuum through extraction port 23311 after removal of plug such as 23221 in FIG. 23.

Figure 25:
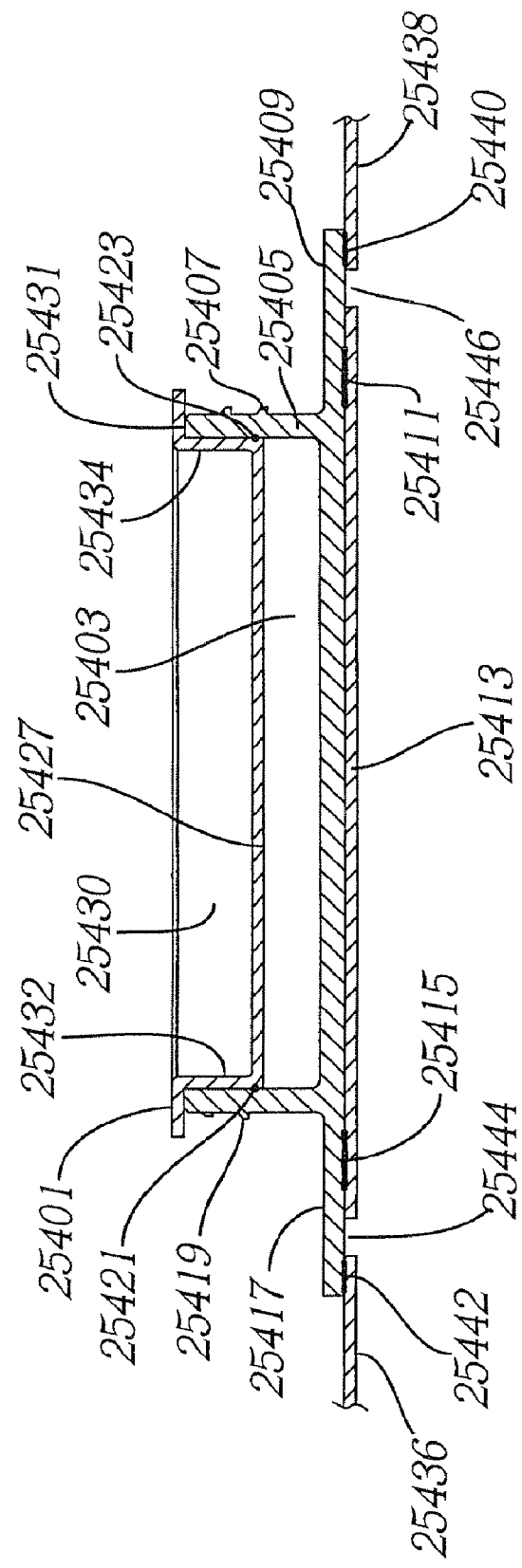
FIG. 25 is a diagrammatical illustration of apparatus in accordance with one embodiment of the present invention.
Figure 26:
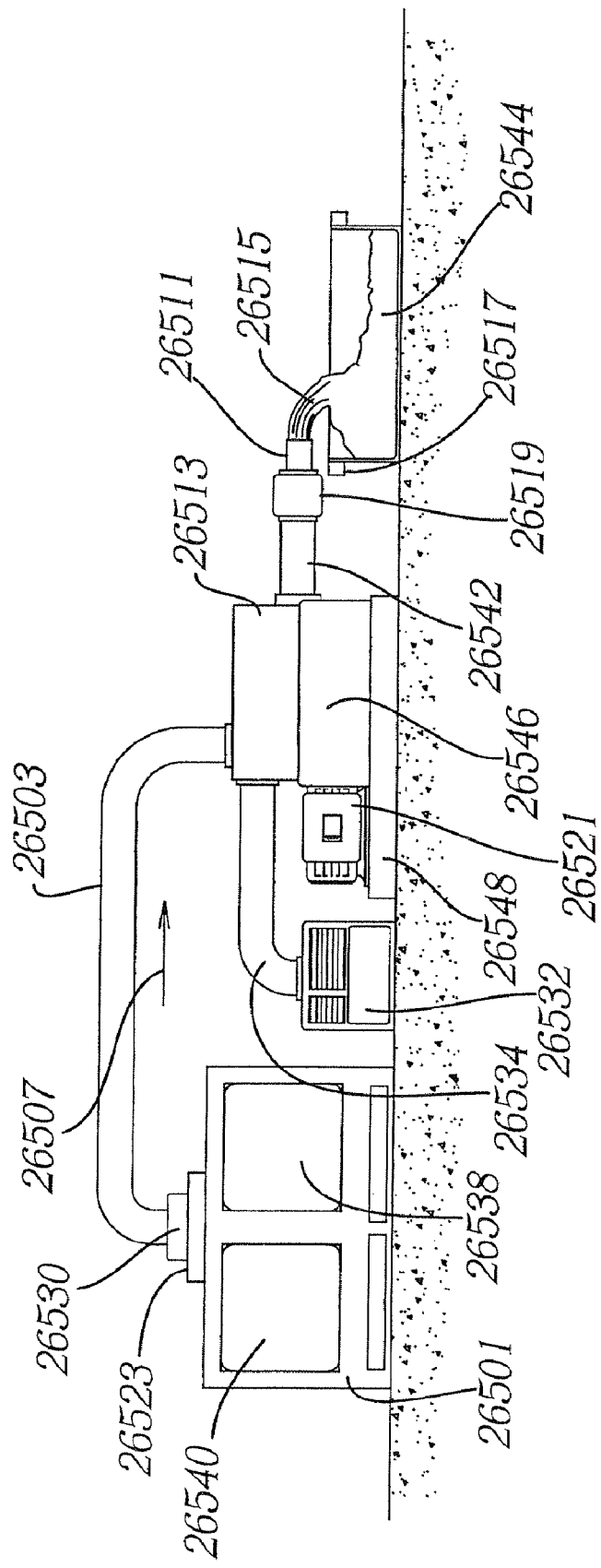
FIG. 26 is a diagrammatical illustration of apparatus in accordance with one embodiment of the present invention.

Referring to FIG. 25, an embodiment is shown detailing in cross-sectional arrangement, an assembled fitment 25405 with threads 25419 and flexible flange 25417 with plug 25430 in place. The assembled fitment can be used in connection with a barrier pouch, such as 24315, as detailed in association with FIG. 24, wherein a valve assembly, attached to a conduit (such as valve assembly 26530 attached to conduit 26503 in FIG. 26) is used to extract the contents of the pouch 24315 in such a manner that will restrict contact of atmospheric air with the goods extracted during the extraction procedure. A flexible flange 25417 and 25409 is attached rigidly to member 25405 which comprises a tubular profiled conduit with threads 25419 and 25407 provided around the external surface of the member 25405. Flexible flange 25409 and 25417 may be hermetically heat sealed to a pouch 25436 and 25438 so as to cover a corresponding and conveniently sized aperture 25444 and 25446 provided in a barrier pouch 25436 and 25438 wherein the seal follows a path at 25442 and 25440. Additionally, a barrier membrane 25413 can be sealed to the flexible flanges 25417 and 25409 at seals 25415 and 25411 and in such a manner so as to provide a hermetic seal restricting the escape or transfer of atmospheric air or any pouch contents. A plug 25430 comprising a base 25427, annular flange shown at 25401 and 25431 and annular walls 25432 and 25434 connecting base 25427 and annular flange 25401 and 25431 to provide a single item, is shown in position and having an interference fit with member 25405. An annular bead shown at 25421 and 25423, engages with plug 25430 so as to provide a hermetic seal which encloses space 25403. Space 25403 can be filled with any suitable gas such as nitrogen. The fitment assembly as described in association with FIG. 25 may be attached, at seal shown at 25442 and 25446, to a barrier pouch with a section thereof shown at 25417 and 25409 and additionally such as pouch 24315 shown in association with FIG. 25, and generally in an example at the location shown by fitment 25311 in FIG. 24. In use, goods contained in pouch 24315 as shown in FIG. 24, can be extracted in the direction shown by arrow 26507 in connection with a conduit such as 26503 shown in FIG. 26 and as described herein below. A specially built attachment 26530 is located adjacent to the extraction port by a locating member 26523 so as to enable a threaded member to engage with threads 25419 and with a suitable rotation of the special assembly, tighten thereto, thereby providing a sealed connection with conduit 26503 as shown in FIG. 26. A gas, such as nitrogen, can be used to purge any open space within conduit 26503 prior to rupturing plug base 25427 and barrier membrane 25413. Gas is provided to purge the free space within conduit 26503 so as to remove any air that may have entered attachment 26530, or any other spaces connected to the inner space of conduit 26503. A vacuum source can then be connected to conduit 26503 in such a manner that will provide a means to extract goods from a pouch, such as 24315 shown in FIG. 24.

Referring to FIG. 26, a side view of an apparatus designed to extract goods, such as boneless beef from a pouch, such as 21019 shown in FIG. 21, is shown with side view of a pallet, such as 21033 shown in FIG. 21. FIG. 26 furthermore includes a grinder 26519 with vacuum pump 26532 with conduit 26534 connecting vacuum pump source 26532 directly to vessel 26513 mounted on base 26548. A palletized frame 26501, similar to the palletized frame shown in FIG. 21, with pouches 26538 and 26540 is shown with attachment 26530 located in position with locating member 26523, and conduit 26503 connected directly to vessel 26513. A base with electric drive motor 26521 and auger screw arrangement in housing 26546 is arranged with conduit 26542 connected directly to meat grinder 26519.

Vessel 26513 is enclosed and attached via conduit 26534 to vacuum source 26532, conduit 26503 connects directly to attachment 26530 which in turn connects to a pouch, such as 26540 or 26538, retained within palletized frame 26501 (similar to palletized frame 21013 disclosed in association with FIG. 21), and conduit 26542 connects directly to an inline grinding head 26519 with a finished ground meat product profiling conduit 26511 connected directly to grinding head 26519. A stream of ground meat 26515 is therefore deposited after grinding by 26519 directly into container 26517. Container 26517 may be substituted with any packaging tray such as an EPS foam, retail packaging tray, or any other suitable packaging tray or container. An auger screw, driven by electric motor 26521 is arranged to transfer boneless beef, under a selected pressure, from vessel 26513 through conduit 26542 and through grinding head 26519 (auger screw is not shown but can be located in housing shown as 26546). The electric motor 26521 is connected to a source of electric power and is arranged with controls to enable the efficient operation of the apparatus which is intended to enable extraction of boneless meat from a pouch, such as 26538 with vacuum assisted transfer into vessel 26513. Vacuum source 26532 can be controlled in concert with electric drive motor 26548 located on base 26548, such that the vacuum source 26532 enables the withdrawal of goods from pouch, such as 26538 via conduit 26503 into vessel 26513, and then transfer by screw means in housing 26546 via conduit 26542 and through controlled grinding head 26519, thereby producing ground meat 26544 shown in container 26517. After filling, packaging (such as may be located in position shown by tray 26517), a lid material such as pPVC can be stretch wrapped over ground meat 26544 and tray (substituted for 26517) to provide a finished retail package. The retail package, such as 26517, can then be weighed and labeled with information including the source of the ground meat, its weight and cost. Other information can be also attached to the finished retail packaging such as the country of origin of the goods. Information about the goods extracted from the pouch, such as 26538, can be read automatically by RFID tag reading equipment, or any other means of reading the information and any selected information can be transferred into mass storage data computers located at the supermarket or any other suitable means of storing information at the supermarket or other location at which each packaging tray of ground meat is sold to a consumer. Any such related information and selected information in connection with the sale of packaged beef or any other ground or freshly sliced meats, can be retained at the supermarket or any other location such as a centrally located mass data storage computer connected via a computer network to the supermarket computer. An RFID tag, such as 23201, described in association with FIG. 23 can be associated with information including the origin of the goods in the particular pouch to which the RFID tag is attached, by virtue of the fitting assembly attached to the referenced pouch also. Information can be downloaded from the tag and either all or parts thereof, can be transferred to a 1-D or 2-D barcode, RFID tag, or other unique marking attached to, for example, a retail package containing goods that may have been or will be transferred directly or transferred to said retail package after further processing such as fine grinding of coarse ground beef extracted from a particular pouch, the identity of which is automatically transferred to the retail package during transfer or immediately thereafter, of goods being extracted from the pouch. Any means of attaching information relating to goods, to the pouch containing the identified goods can be used, such as 1D or 2D barcodes and then the information can be transferred from the pouch with the goods and applied to packaging into which the goods are transferred without or after processing of the goods.

Referring again to FIG. 26, an RFID tag such as 23201 described in association with FIG. 23, can be automatically loaded with or associated with, information and/or data that enables the tracking and tracing of the origin of the goods contained in the barrier pouch to which the RFID tag is attached. In this way, for example, boneless beef harvested from one or more animals slaughtered in another country such as Australia, can be identified by associating the information with the RFID tag at the point of packaging in such a manner that will allow the transfer of said information from said RFID tag when the contents of the pouch from which the goods are extracted are further processed and packaged as desired. Information transferred from the RFID tag can be associated with the goods by attaching the information to any package in which the goods are subsequently loaded thereby enabling the purchaser of any goods so packaged to access a database (into which all information may have been stored) via a computer network such as the Internet, and to which the computer database with information is connected.

While illustrative embodiments have been illustrated and described, it will be appreciated that various changes can be made therein without departing from the spirit and scope of the invention.

The invention claimed is:
1. A method for separating fat, comprising:
(a) combining particles comprising fat and lean meat or both fat and lean meat with a fluid;

(b) introducing the particles and the fluid into an enclosed separator having one or more inclined surfaces;

(c) separating particles at different elevations of the separator, wherein the particles having a density greater than the fluid will collect at a lower elevation, and the particles that have a density less than the fluid will collect at a relatively higher elevation; and (d) reducing the size of the particles that have a density less than the fluid, and separating oil from solid material via a centrifuge.

2. A separator, comprising:

(a) a first enclosed conduit disposed at an incline;

(b) a second enclosed conduit disposed at an incline, wherein a lower side of the first conduit is joined to an upper side of the second conduit to allow material that settles to the lower side of the first conduit to be transferred into the second conduit; and (c) a screw conveyor where the first conduit joins the second conduit.

* * * * *